(12) United States Patent
Suzuki et al.

(10) Patent No.: US 12,163,231 B2
(45) Date of Patent: Dec. 10, 2024

(54) PLATED STEEL SHEET FOR HOT STAMPING AND HOT-STAMPED MEMBER

(71) Applicant: NIPPON STEEL CORPORATION, Tokyo (JP)

(72) Inventors: Yuki Suzuki, Tokyo (JP); Soshi Fujita, Tokyo (JP); Jun Maki, Tokyo (JP); Kazuhisa Kusumi, Tokyo (JP); Masahiro Fuda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/768,161

(22) PCT Filed: Nov. 29, 2019

(86) PCT No.: PCT/JP2019/046720
§ 371 (c)(1),
(2) Date: Apr. 11, 2022

(87) PCT Pub. No.: WO2021/106178
PCT Pub. Date: Jun. 3, 2021

(65) Prior Publication Data
US 2024/0091842 A1    Mar. 21, 2024

(51) Int. Cl.
*C23C 2/26* (2006.01)
*B21D 35/00* (2006.01)
*C23C 2/12* (2006.01)

(52) U.S. Cl.
CPC .............. *C23C 2/26* (2013.01); *B21D 35/007* (2013.01); *C23C 2/12* (2013.01)

(58) Field of Classification Search
None
See application file for complete search history.

(56) References Cited

U.S. PATENT DOCUMENTS

| 8,986,849 B2* | 3/2015 | Maki | ..................... C23C 2/0038 |
| | | | 428/653 |
| 10,196,717 B2* | 2/2019 | Maki | ........................ C23C 2/12 |

(Continued)

FOREIGN PATENT DOCUMENTS

| JP | 2003-34845 A | 2/2003 |
| JP | 2005-238286 A | 9/2005 |

(Continued)

*Primary Examiner* — Daniel J. Schleis
(74) *Attorney, Agent, or Firm* — Birch, Stewart, Kolasch & Birch, LLP

(57) ABSTRACT

A plated steel sheet for hot stamping according to one aspect of the present invention includes a steel sheet, a plating layer formed on either surface or both surfaces of the steel sheet and having an Al content of 60 mass % or more, and a surface film layer formed on the plating layer. A thickness t of the plating layer is 10 to 60 μm. An average crystal grain diameter of the plating layer in a thickness range from an interface between the plating layer and the surface film layer to a position at ⅔ of the thickness t is 2t/3 or less and 15.0 μm or less. A surface film layer contains particles containing one or more elements selected from A group elements consisting of Sc, V, Mn, Fe, Co, Ce, Nb, Mo, and W. A total content of the A group elements is 0.01 to 10.0 g/m². An average grain diameter of the particles containing the A group elements is 0.05 to 3.0 μm.

11 Claims, 1 Drawing Sheet

(56) References Cited

U.S. PATENT DOCUMENTS

| | | |
|---|---|---|
| 2014/0048181 A1 | 2/2014 | Banik et al. |
| 2015/0044499 A1 | 2/2015 | Maki et al. |
| 2020/0189233 A1 | 6/2020 | Suzuki et al. |

FOREIGN PATENT DOCUMENTS

| | | |
|---|---|---|
| JP | 2009-293078 A | 12/2009 |
| JP | 2013-221202 A | 10/2013 |
| JP | 2014-512457 A | 5/2014 |
| WO | WO2018/221738 A1 | 12/2018 |

\* cited by examiner

PLATED STEEL SHEET FOR HOT STAMPING AND HOT-STAMPED MEMBER

TECHNICAL FIELD OF THE INVENTION

The present invention relates to a plated steel sheet for hot stamping and a hot-stamped member.

BACKGROUND ART

In recent years, there has been a request for suppressing the consumption of chemical fuels in order for environmental protection and global warming prevention. This request is affecting a variety of manufacturing industries. For example, automobiles, which are indispensable for daily lives and activities as a moving means, are no exception. In the automobile manufacturing industry, there is a demand for improvement in gas mileage by the weight reduction or the like of vehicle bodies. However, in the automobile manufacturing industry, simple weight reduction of vehicle bodies is not permitted in terms of product quality, and there is a need to ensure appropriate safety.

The majority of automobile structures are formed of iron, particularly, steel sheets, and the weight reduction of the steel sheets is important for the weight reduction of vehicle bodies. However, as described above, simple weight reduction of steel sheets is not permitted, and there is also a request for ensuring the mechanical strength of steel sheets. Such a request for steel sheets is requested not only in the automobile manufacturing industry but also in a variety of manufacturing industries. Therefore, research and development are underway regarding steel sheets capable of maintaining or increasing the mechanical strength in spite of a thinner sheet thickness than those of conventional steel sheets by increasing the mechanical strength of the steel sheets.

Ordinarily, materials having a high mechanical strength tend to deteriorate in shape fixability during forming such as bending. Therefore, in a case where a material having a high mechanical strength is processed into a complicated shape, the process itself becomes difficult in some cases. As one of means for solving this problem regarding formability, a so-called "hot stamping method (also referred to as a hot pressing method, a hot pressing method, a high-temperature pressing method, or a die quenching method)" is exemplified. The hot stamping method is a method in which a steel sheet, which is a forming workpiece, is heated to a high temperature in the austenite region and the steel sheet softened by heating is formed by pressing and then cooled in a state of being confined in a die. According to the hot stamping method, since the steel sheet is once heated to a high temperature in the austenite region and softened, it is possible to easily press the steel sheet, and furthermore, the mechanical strengths of formed articles can be increased by a quenching effect of cooling after forming. Therefore, the hot stamping method makes it possible to obtain a formed article having favorable shape fixability and a high mechanical strength.

However, in the case of applying this hot stamping method to steel sheets, for members and the like requiring corrosion resistance, there is a need to perform an antirust treatment or metal coating on the surfaces of the members after processes. In this case, a surface cleaning step, a surface treatment step, and the like become necessary, which degrades the productivity.

Patent Document 1 describes an aluminum-plated steel sheet for hot stamping having an Al-based metal coating that contains Al as a main component and contains Mg and Si on a surface of steel.

Patent Document 2 relates to a vehicle member and describes that an oxide film having a thickness of 0.05 to 1 μm is formed on a surface of an Al—Fe intermetallic compound layer after hot stamping. In addition, Patent Document 2 describes that an Al-plated steel sheet for hot pressing is heated such that the oxide film has a predetermined thickness, and the Al—Fe intermetallic compound layer is formed up to a surface layer, thereby suppressing a coating film defect or adhesion deterioration after electrodeposition coating to ensure corrosion resistance after coating.

PRIOR ART DOCUMENT

Patent Document

[Patent Document 1] Japanese Unexamined Patent Application, First Publication No. 2003-034845
[Patent Document 2] Japanese Unexamined Patent Application, First Publication No. 2009-293078

DISCLOSURE OF THE INVENTION

Problems to be Solved by the Invention

In the method described in Patent Document 1, the corrosion resistance after coating after hot stamping is not sufficient. It is presumed that this is because the affinity to a coating film or a chemical conversion layer in a layer on the outermost surface is not sufficiently strong due to the influence of the compound composition or grain diameters of the outermost surface.

It is difficult to obtain sufficient corrosion resistance after coating by controlling the structure or thickness of the Al—Fe intermetallic compound layer as described in Patent Document 2. It is presumed that this is because the poor reactivity between the oxide film and a chemical conversion agent causes a decrease in the adhesion amount of a chemical conversion film or the like.

As described above, in the related art, there has been a problem in that it is difficult to ensure sufficient corrosion resistance after coating when a hot-stamped member has been produced by hot-stamping a plated steel sheet.

The present invention has been made in consideration of the above-described circumstances, and an objective of the present invention is to provide a hot-stamped member having excellent chemical convertibility and corrosion resistance after coating and a plated steel sheet for hot stamping enabling the obtainment of this hot-stamped member.

Means for Solving the Problem

In automobile manufacturing steps where a plated steel sheet for hot stamping having a plating layer and a surface film layer formed on a steel sheet is used, the plated steel sheet for hot stamping is heated and formed in a hot stamping step to produce a hot-stamped member. A chemical conversion film represented by a zinc phosphate film, an electrodeposition coating film on an upper layer thereof, and furthermore, depending on cases, a coating film on an upper layer thereof are laminated on the surface of the member (on the surface film layer), and the hot-stamped member is put into practical use.

It is presumed that, in corrosive environments, an anode dissolution reaction of aluminum, iron, or an intermetallic compound of aluminum and iron that is formed in the hot stamping step occurs according to reaction formulae as shown in the following formulae (1) to (3), whereby a corrosion product is formed and the swelling of the coating film proceeds.

$$Al \rightarrow Al^{3+} + 3e^- \quad (1)$$

$$Fe \rightarrow Fe^{2+} + 2e^- \quad (2)$$

$$Fe_xAl_y \rightarrow xFe + yAl + (2x+3y)e^- \quad (3)$$

The present inventors attempted to solve the above-described problem by containing a predetermined amount of particles containing elements capable of having plural kinds of stable valence of +1 or higher (for example, trivalent and hexavalent or the like) in a surface film layer that is formed on a plating layer in which a grain refining treatment has been performed on the metallographic structure of the plating layer by spraying particles immediately after plating and, furthermore, setting the average grain diameter of the particles containing these elements within a predetermined range. Specifically, the present inventors attempted to solve the above-described problem by forming a surface film layer in which particles containing one or more elements selected from A group elements consisting of Sc, V, Mn, Fe, Co, Ce, Nb, Mo, and W are contained, as the content of the A group elements, the total content of the A group elements is 0.01 to 10.0 g/m², and the average grain diameter of the particles containing the A group elements is 0.05 to 3.0 μm on the plating layer.

The A group element that is contained in the particles is capable of forming an oxide having a higher valence after hot stamping. As a result, electron bias (polarity) in the oxide becomes higher, and the interaction with a component in a chemical conversion liquid, which is, similarly, highly polar, for example, zinc phosphate, becomes stronger, whereby the chemical convertibility improves. The expression "the chemical convertibility improves" means that the adhesion amount of a chemical conversion film increases in a case where a chemical conversion has been performed on a hot-stamped member. In addition, the expression "corrosion resistance after coating improves" means that, in a case where a chemical conversion is performed on a hot-stamped member and a defect is made with a cutter on the surface on which a coating film has been formed by electrodeposition lacquer, the width of the swelling of the coating film in corrosive environments becomes small. When the chemical convertibility becomes high and the adhesion amount of the chemical conversion film increases, the adhesion between the chemical conversion film and the electrodeposition coating film becomes high, and the corrosion resistance after coating improves.

When the surface film layer contains the particles containing the A group elements, an action of preventing a corrosion factor such as moisture or a salt content in corrosive environments from reaching plating metal in corrosive environments after a chemical conversion film, for example, a zinc phosphate film is formed on an upper layer of the surface film layer, and, furthermore, an electrodeposition coating film is formed on an upper layer is expected.

In addition, since the A group elements in an inorganic film are contained in a particle state, the surface area of the surface film layer becomes large, and a time required for heating becomes long at the time of hot stamping. In addition, since the amount of the A group elements present close to an atmosphere where moisture or oxygen is present increases, the A group elements are likely to be concentrated on the surface of the surface film layer. In such a case, at the time of a chemical conversion after hot stamping, for example, at the time of a phosphoric acid treatment, zinc phosphate is likely to adhere, and the chemical convertibility improves, whereby the adhesion after coating improves.

Although there is an unclear point regarding the mechanism of the coating adhesion of the hot-stamped member being improved by the grain refinement of the metallographic structure of the plating layer, the present inventor presumes the mechanism as described below. The number of crystal grain boundaries can be increased by controlling the average crystal grain diameter of the plating layer to be small. As a result, it is presumed that the number of the grain boundaries increases even after hot stamp heating, and more unevennesses are also formed on the oxide film layer on the surface, and thus the physical and chemical bonds with the electrodeposition coating film after the chemical conversion become strong.

The A group elements are contained in the oxide film layer mainly in an oxide form. When a chemical conversion is performed on the outermost surface of the above-described hot-stamped member (the surface of the oxide film layer), the presence of the oxide of the A group element on the outermost surface of the hot-stamped member increases the pH of the chemical conversion liquid in the interface between the oxide film layer and the chemical conversion liquid. Therefore, the amount of zinc phosphate crystals precipitated becomes large. That is, so-called chemical convertibility is enhanced. In addition, the increase in the amount of zinc phosphate crystals precipitated improves the adhesion (lacquer adhesion) of the electrodeposition coating film that is electrodeposition-coated after the chemical conversion. The enhancement of the adhesion of the electrodeposition coating film improves the corrosion resistance after coating.

The present invention has been made based on the above-described findings, and the gist thereof is as described below.

(1) A plated steel sheet for hot stamping according to one aspect of the present invention including:
  a steel sheet,
  a plating layer formed on either surface or both surfaces of the steel sheet and having an Al content of 60 mass % or more, and
  a surface film layer formed on the plating layer,
  in which a thickness t of the plating layer is 10 to 60 μm,
  an average crystal grain diameter of the plating layer in a thickness range from an interface between the plating layer and the surface film layer to a position at ⅔ of the thickness t is 2t/3 or less and 15.0 μm or less,
  the surface film layer contains particles containing one or more elements selected from A group elements consisting of Sc, V, Mn, Fe, Co, Ce, Nb, Mo, and W,
  a total content of the A group elements in the surface film layer is 0.01 to 10.0 g/m², and
  an average grain diameter of the particles containing the A group elements is 0.05 to 3.0 μm.
(2) The plated steel sheet for hot stamping according to (1), in which at least some of the particles containing the A group elements may contain O.
(3) The plated steel sheet for hot stamping according to (1) or (2),
  in which the surface film layer may further contains particles containing one or more elements selected from B group elements consisting of Zn, Zr, and Ti, and a total content of the B group elements in the surface film layer may be 0.01 to 10.0 g/m$^2$.

(4) The plated steel sheet for hot stamping according to any one of (1) to (3), in which a total content of Ca, Mg, Sr, and Ti in the plating layer may be 0.01 to 20 mass % of the entire plating layer.

(5) A hot-stamped member according to another aspect of the present invention is a hot-stamped member that is obtained by hot-stamping the plated steel sheet for hot stamping according to (1) to (4), the hot-stamped member including:

an oxide film layer containing one or more elements selected from A group elements consisting of Sc, V, Mn, Fe, Co, Ce, Nb, Mo, and W, Al, and oxygen on a surface.

Effects of the Invention

According to the aspects of the present invention, it is possible to provide a hot-stamped member having excellent chemical convertibility and corrosion resistance after coating and a plated steel sheet for hot stamping enabling the obtainment of this hot-stamped member.

EMBODIMENTS OF THE INVENTION

Hereinafter, a preferable embodiment of the present invention will be described in detail.

Figure 1:
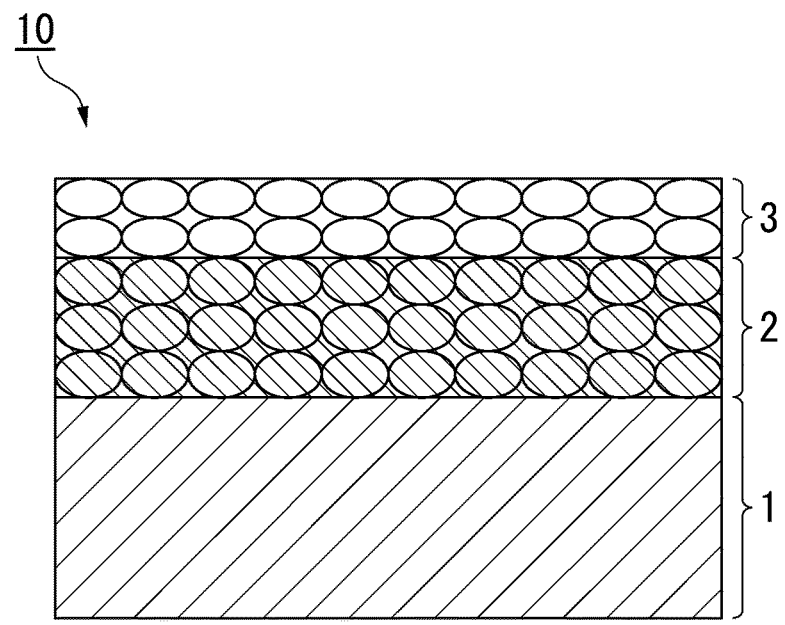
FIG. 1 is a cross-sectional view of a plated steel sheet for hot stamping according to the present embodiment.

FIG. 1 is a view showing a plated steel sheet for hot stamping 10 according to the present embodiment (hereinafter, be simply referred to as the plated steel sheet in some cases). The plated steel sheet 10 according to the present embodiment includes a steel sheet 1, a plating layer 2 formed on either surface or both surfaces of the steel sheet 1 and containing Al, and a surface film layer 3 formed on the plating layer 2.

(Steel Sheet 1)

The chemical compositions of the steel sheet 1 which serves as the base metal of the plated steel sheet for hot stamping 10 according to the present embodiment are not particularly limited. However, as the steel sheet 1 according to the present embodiment, a steel sheet from which high mechanical characteristics (strengths against mechanical distortion and fracture such as tensile strength, yield stress, elongation, reduction in area, hardness, impact value, and fatigue strength) can be obtained after hot stamping is desirably used.

In order to obtain high mechanical strengths after hot stamping, it is preferable that the chemical compositions of the steel sheet 1 contain, by mass %, C: 0.10% to 0.60%, Si: 0.01% to 0.60%, Mn: 0.01% to 3.00%, P: 0.050% or less, S: 0.050% or less, Al: 1.00% or less, Ti: 0.001% to 0.100%, B: 0.0001% to 0.0100%, and N: 0.0100% or less and the remainder includes Fe and an impurity. "%" relating to the content of each element indicates "mass %" unless particularly otherwise described. The preferable chemical compositions of the steel sheet 1 according to the present embodiment will be described below.

C: 0.10% to 0.60%

C is contained to obtain a desired mechanical strength. In a case where the C content is less than 0.10%, an effect on improvement in the mechanical strength cannot be sufficiently obtained, and there is a case where the effect of containing C cannot be obtained. On the other hand, in a case where the C content exceeds 0.60%, it is possible to further improve the strength of the steel sheet 1, but there is a case where the elongation and the reduction in area decrease. Therefore, the C content is preferably 0.10% to 0.60%. The lower limit of the C content may be set to 0.15% or 0.20%, and the upper limit of the C content may be set to 0.50% or 0.40% as necessary.

Si: 0.01% to 0.60%

Si is a strength-improving element that improves the mechanical strength and, similar to C, is contained to obtained a desired mechanical strength of the steel sheet 1. In a case where the Si content is less than 0.01%, the strength improvement effect is not likely to be exhibited, and there is a case where the mechanical strength does not sufficiently improve. On the other hand, since Si is also an easily oxidizing element, in a case where the Si content exceeds 0.60%, there is a case where the wettability deteriorates and a non-plated part is generated due to the influence of a Si oxide formed on the surface layer of the steel sheet 1 at the time of performing hot-dip plating. Therefore, the Si content is preferably 0.01% to 0.60%.

Mn: 0.01% to 3.00%

Mn is a strength-improving element that improves the mechanical strength and is also an element that enhances the hardenability. Furthermore, Mn is effective for preventing hot embrittlement attributed to S, which is an impurity. In a case where the Mn content is less than 0.01%, there is a case where the above-described effects cannot be obtained. On the other hand, since Mn is a γ-forming element, in a case where the Mn content exceeds 3.00%, there is a case where retained γ becomes too much and the strength of the hot-stamped member decreases. Therefore, the Mn content is preferably 0.01% to 3.00%. The lower limit of the Mn content may be set to 0.30% or 0.50%, and the upper limit of the Mn content may be set to 2.50% or 2.10% as necessary.

P: 0.050% or Less

P is an element that degrades the toughness of the hot-stamped member after quenching. Particularly, when the P content exceeds 0.050%, there is a case where the toughness of the hot-stamped member significantly deteriorates. Therefore, the P content is preferably 0.050% or less. In addition, the P content is more preferably 0.005% or less.

P is incorporated as an impurity from a scrap or the like during the production of molten steel, but the lower limit thereof does not need to be particularly limited, and the lower limit is 0%. However, when the P content is excessively decreased, the manufacturing cost increases. Therefore, the lower limit of the P content may be 0.001% or more or 0.002% or more.

S: 0.050% or Less

S is an element that degrades the toughness of the hot-stamped member after quenching. Particularly, when the S content exceeds 0.050%, there is a case where the toughness of the hot-stamped member significantly deteriorates. Therefore, the S content is preferably 0.050% or less. In addition, the S content is more preferably 0.003% or less.

S is incorporated as an impurity from a scrap or the like during the production of molten steel, but the lower limit thereof does not need to be particularly limited, and the lower limit is 0%. However, when the S content is excessively decreased, the manufacturing cost increases. Therefore, the lower limit of the S content may be 0.001% or more.

Al: 1.00% or Less

Al is an element that enhances the hardenability of steel and makes it possible to stably ensure the strength of the hot-stamped member after quenching. However, when the Al content exceeds 1.00%, the above-described effect is saturated, and the cost is increased. Therefore, the Al content is preferably set to 1.00% or less. In addition, in order to obtain the above-described effect, the Al content is preferably set to 0.01% or more.

Ti: 0.001% to 0.100%

Ti is a strength-strengthening element that improves the mechanical strength. When the Ti content is less than 0.001%, there is a case where the strength-improving effect and an oxidation resistance-improving effect cannot be obtained. On the other hand, when Ti is excessively contained, there is a case where, for example, a carbide or a nitride is formed and steel is softened. Particularly, when the Ti content exceeds 0.100%, there is a case where a desired mechanical strength cannot be obtained. Therefore, the Ti content is preferably 0.001% to 0.100%.

B: 0.0001% to 0.0100%

B has an effect of improving the strength of steel during quenching. When the B content is less than 0.0001%, there is a case where the strength-improving effect cannot be sufficiently obtained. On the other hand, when the B content exceeds 0.0100%, there is a case where an inclusion is formed in steel, the steel sheet 1 becomes brittle, and the fatigue strength decreases. Therefore, the B content is preferably 0.0001% to 0.0100%.

N: 0.0100% or Less

N is an element that degrades the toughness of the hot-stamped member after quenching. Particularly, when the N content exceeds 0.0100%, a coarse nitride is formed in steel, and the local deformability or toughness of the steel sheet 1 significantly deteriorates. Therefore, the N content is preferably 0.0100% or less. The lower limit of the N content does not need to be particularly limited; however, when the N content is set to less than 0.0002%, there is a case where the cost increases. Therefore, the N content is preferably set to 0.0002% or more and more preferably set to 0.0008% or more.

In addition to the above-described elements, one or more elements selected from Cr, Ni, Cu, V, Nb, Sn, Mo, W, Ca, and REM shown below may be further contained in the steel sheet 1 according to the present embodiment.

Cr: 0% to 1.0%

Cr is an element that enhances the hardenability of steel and makes it possible to stably obtain the strength of the hot-stamped member after quenching and thus may be contained. In addition, Cr forms $FeCr_2O_4$ on the surface of the steel sheet during a heat treatment to suppress the generation of scale and plays a role of reducing FeO in the scale. Since this $FeCr_2O_4$ becomes as a barrier layer, which blocks the supply of Fe into the scale, it is possible to reduce the thickness of the scale. When the thickness of the scale is thin, there is a merit of making the scale less likely to peel off during hot forming and making the scale easily peelable during a scale removal treatment after hot stamping. However, when the Cr content exceeds 1.0%, the above-described effects are saturated, and the cost is increased. Therefore, in a case where Cr is contained, the Cr content is set to 1.0% or less. The Cr content is preferably 0.8% or less. In order to obtain the above-described effects, the Cr content is preferably 0.01% or more and more preferably 0.05% or more.

Ni: 0% to 2.0%

Ni is an element that enhances the hardenability of steel and makes it possible to stably obtain the strength of the hot-stamped member after quenching and thus may be contained. However, when the Ni content exceeds 2.0%, the above-described effect is saturated, and the cost increases. Therefore, in a case where Ni is contained, the Ni content is set to 2.0% or less. In order to obtain the above-described effect, the Ni content is preferably set to 0.1% or more.

Cu; 0% to 1.0%

Cu is an element that enhances the hardenability of steel and makes it possible to stably obtain the strength of the hot-stamped member after quenching and thus may be contained. In addition, Cu is also an element that improves the pitting corrosion resistance of the steel sheet 1 in corrosive environments. When the Cu content exceeds 1.0%, the above-described effect is saturated, and the cost increases. Therefore, in a case where Cu is contained, the Cu content is set to 1.0% or less. In order to obtain the above-described effect, the Cu content is preferably set to 0.1% or more.

V: 0% to 1.0%

V is an element that enhances the hardenability of steel and makes it possible to stably obtain the strength of the hot-stamped member after quenching and thus may be contained. However, when the V content exceeds 1.0%, the above-described effect is saturated, and the cost increases. Therefore, in a case where V is contained, the V content is set to 1.0% or less. In order to obtain the above-described effect, the V content is preferably set to 0.1% or more.

Nb: 0% to 1.0%

Nb is an element that enhances the hardenability of steel and makes it possible to stably obtain the strength of the hot-stamped member after quenching and thus may be contained. However, when the Nb content exceeds 1.0%, the above-described effect is saturated, and the cost increases. Therefore, in a case where Nb is contained, the Nb content is set to 1.0% or less. In order to obtain the above-described effect, Nb content is preferably set to 0.01% or more.

Sn: 0% to 1.0%

Sn is an element that improves the pitting corrosion resistance of the steel sheet 1 in corrosive environments and thus may be contained. However, when the Sn content exceeds 1.0c, the grain boundary strength decreases, and the toughness deteriorates. Therefore, in a case where Sn is contained, the Sn content is set to 1.0% or less. In order to obtain the above-described effect, the Sn content is preferably set to 0.01% or more.

Mo: 0% to 1.0%

Mo is an element that enhances the hardenability of steel and makes it possible to stably ensure the strength of the hot-stamped member after quenching and thus may be contained. However, when the Mo content exceeds 1.0%, the above-described effect is saturated, and the cost increases. Therefore, in a case where Mo is contained, the Mo content is set to 1.0% or less. In order to obtain the above-described effect, the Mo content is preferably set to 0.1% or more.

W: 0% to 1.0%

W is an element that enhances the hardenability of steel and makes it possible to stably ensure the strength of the hot-stamped member after quenching and thus may be contained. In addition, W is also an element that improves the pitting corrosion resistance of the steel sheet 1 in corrosive environments. However, when the W content exceeds 1.0%, the above-described effect is saturated, and the cost increases. Therefore, in a case where W is contained, the W content is set to 1.0% or less. In order to obtain the above-described effect, the W content is preferably set to 0.01% or more.

Ca: 0% to 0.01%

Ca is an element that has an effect of refining inclusions in steel and improves the toughness and the ductility after quenching and thus may be contained. However, when the Ca content exceeds 0.01%, the above-described effect is saturated, and the cost increases. Therefore, in a case where Ca is contained, the amount of Ca is set to 0.01% or less. The Ca content is preferably 0.004% or less. In order to reliably obtain the above-described effects, the Ca content is preferably set to 0.001% or more and more preferably set to 0.002% or more.

REM: 0% to 0.3%

REM is, similar to Ca, an element that has an effect of refining inclusions in steel and improves the toughness and the ductility after quenching and thus may be contained. However, when the REM content exceeds 0.3%, the above-described effect is saturated, and the cost increases. Therefore, in a case where REM is contained, the REM content is set to 0.3% or less. The REM content is preferably 0.2% or less. In order to reliably obtain the above-described effects, the REM content is preferably set to 0.001% or more and more preferably set to 0.002% or more.

Here, REM refers to a total of 17 elements consisting of Sc, Y, and lanthanoid, and the REM content means the total contents of these elements. REM is added to molten steel using, for example, a Fe—Si-REM alloy, and, in this alloy, for example, Ce, La, Nd, and Pr are contained.

The steel sheet 1 according to the present embodiment may contain, in addition to the above-described elements, an impurity that is incorporated in the manufacturing steps or the like. In a case where the plating layer 2 and the surface film layer 3, which will be described below, are formed on the steel sheet 1 having the above-described chemical compositions, it is possible to realize a tensile strength of approximately 1000 Mpa or more by heating and quenching by a hot stamping method.

The sheet thickness of the steel sheet 1 according to the present embodiment is not particularly limited, but is preferably set to 0.6 to 2.5 mm.

(Plating Layer 2)

The plating layer 2 according to the present embodiment is formed on either surface or both surfaces of the above-described steel sheet 1. The plating layer 2 according to the present embodiment contains Al. In the present embodiment, the plating layer containing Al means a plating layer containing 60% or more of Al in terms of mass %. As elements other than Al in the plating layer 2, approximately 0.1% to 20% of Si, approximately 0.1% to 10% of Fe, and approximately 0.1% to 40% of Zn may be each contained. The lower limit of the content of each of Si, Fe, and Zn is 0%, but the lower limit may be set to 0.1% as described above. In particular, Si has an effect of improving the sliding ability of the plating layer 2 by suppressing the growth of an alloy layer of Al and Fe (Al—Fe alloy layer). As for Fe, it is conceivable that Fe that is contained in a device or the like (for example, in the case of a hot-dip plating method, a stainless steel container containing a plating solution or the like) is incorporated into the plating layer 2. Zn has an effect of improving the corrosion resistance in a portion where the base metal is exposed by lowering the potential of the plating layer 2. The remainder of the plating layer 2 includes less than 0.5% of an impurity. Examples of the impurity include Cu, Na, K, Co, and the like. Here, the content of each element does not need to be within the above-described range at all sites in the plating layer 2, but the average chemical composition of the entire plating layer 2 needs to be within the above-described range. Therefore, in the case of manufacturing the plating layer 2 by the hot-dip plating method, it is possible to set the average chemical composition of the entire plating layer 2 within the above-described range by setting the chemical composition of a plating bath within the above-described range.

The thickness t of the plating layer 2 is set to 10 to 60 µm. When the thickness t of the plating layer 2 is set to 10 µm or more, it is possible to improve the corrosion resistance of the hot-stamped member. In addition, when the thickness t of the plating layer is set to 60 µm or less, since an Al—Fe intermetallic compound layer is formed up to the outermost layer or near the outermost layer, the corrosion resistance of the hot-stamped member improves. The thickness t of the plating layer 2 is preferably set to 13 µm or more or 15 µm or more. In addition, the thickness t of the plating layer 2 is preferably set to 55 µm or less, 50 µm or less, or 45 µm or less.

The thickness t of the plating layer 2 can be measured, for example, by quantitatively analyzing a sample from a cross section with a field emission electron probe microanalyzer (FE-EPMA).

In the present embodiment, a 10 mm×10 mm-sized sample is cut out from a portion 10 mm or more apart in the width direction, specifically, for example, a site 15 mm apart from the end portion of the plated steel sheet 10. The sample is embedded in a resin and polished to obtain an embedded and polished sample. Carbon is deposited on the embedded and polished sample so that the sample is easily energized, and then a point analysis is performed using the FE-EPMA at an acceleration voltage of 10 kV and a magnification of 1500 times or more, thereby quantitatively analyzing the content of each element. A layer where the Al content becomes 30 mass % or more of the total of elements excluding mass carbon is regarded as the plating layer 2. The point analysis is performed every 1 µm perpendicularly to the steel sheet from the plating surface toward the center of the sheet thickness, and points where the Al content is less than 30 mass % are determined to be not the plating layer 2. In addition, the collection of points where the Al content is 30 mass % or more is regarded as the plating layer 2, and the thickness t of the plating layer 2 is obtained.

The average crystal grain diameter of the plating layer 2 in a thickness range from the interface between the plating layer 2 and the surface film layer 3 to a position at ⅔ of the thickness t (2t/3 position) is 2t/3 (µm) or less and 15.0 µm or less. When the average crystal grain diameter of the plating layer 2 is set to 2t/3 (µm) or less and 15.0 µm or less in this thickness range, the area of crystal grain boundaries becomes large, and the interfacial area with an atmospheric gas such as the atmosphere during hot stamping heating becomes large. Therefore, the amount of zinc phosphate crystals precipitated becomes large. That is, so-called chemical convertibility is enhanced. In addition, the enhancement of the chemical convertibility improves the adhesion of an electrodeposition coating film that is electrodeposition-coated after the chemical conversion. The enhancement of the adhesion of the electrodeposition coating film improves the corrosion resistance after coating the hot-stamped member.

After hot stamping, the corrosion resistance after coating improves as described above; however, it is presumed that, even in a case where hot stamping is not performed, when the average crystal grain diameter of the plating layer 2 is 2t/3 (µm) or less and 15.0 µm or less in the above-described thickness range, the number of the grain boundaries increases, and more unevennesses are also formed on the oxide film layer on the surface, and thus the physical and chemical bonds with the electrodeposition coating film after the chemical conversion become strong. As a result, the corrosion resistance after coating improves.

The average crystal grain diameter of the plating layer 2 can be obtained by the following method.

Figure 2:
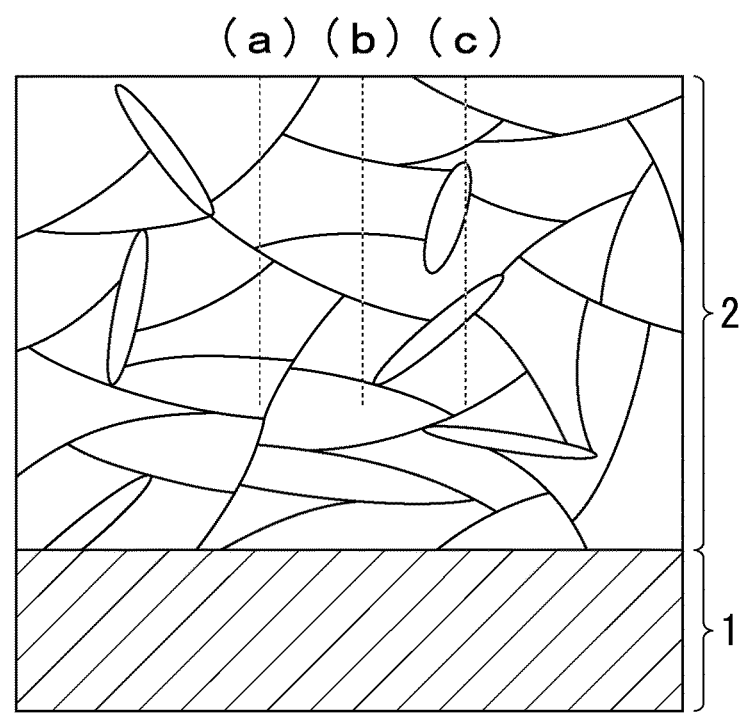
FIG. 2 is a schematic view showing a measuring method of an average crystal grain diameter of a plating layer in the plated steel sheet for hot stamping according to the present embodiment.

A sample is collected from the plated steel sheet for hot stamping 10 such that a cross section of the plating layer 2 in the thickness direction serves as an observed section. The collected sample is etched with a 3% nitric acid alcohol solution (Nital solution) to cause crystal grain boundaries to appear, and an image is captured using a scanning electron microscope (SEM) such that a range from the interface between the plating layer 2 and the surface film layer 3 to the steel sheet 1 is included. A line segment having a length of 2t/3 (t=the thickness (µm) of the plating layer) is drawn in the thickness direction from the interface between the plating layer 2 and the surface film layer (not shown) on this photograph as shown in FIG. 2, the number of intersection points with grain boundaries is represented by n, and the value obtained by dividing the line segment length (2t/3) by n, that is, (2t/3n) is regarded as the average crystal grain diameter. Three line segments are drawn as described above at random positions at intervals of 5 µm as shown by (a), (b), and (c) in FIG. 2, the average crystal grain diameters are obtained at the positions of the individual line segments, and a value obtained by averaging the average crystal grain diameters is regarded as the average crystal grain diameter of the plating layer 2 in the thickness range from the interface between the plating layer 2 and the surface film layer 3 to the position at ⅔ of the thickness t (2t/3 position).

In a case where n is 0, it is not possible to calculate 2t/3n. However, in a case where n is 0, this is a case where the grain diameters are larger than 2t/3 in the observation image, and thus the average crystal grain diameter is determined to be not 2t/3 or less.

In addition, in the calculation of the number n of the intersection points, as described in Annex C.2.2 of JIS G 0551: 2013, in a case where a line segment intersects with a triple point, n is regarded as 1.5 at that point.

The plating layer 2 according to the present embodiment may be formed on the surface of the steel sheet 1 by, for example, the hot-dip plating method. At least a part of the plating layer 2 can be alloyed with Fe in the steel sheet 1 at the time of metal coating, at the time of heating in hot pressing, or the like in the hot-dip plating method. Therefore, the plating layer 2 according to the present embodiment is not necessarily a single layer having constant chemical compositions and may include an alloyed layer as appropriate.

The plating layer 2 according to the present embodiment preferably contains one or more elements of Ca, Mg, Sr, and Ti. When the above-described element is contained in the plating layer 2, the corrosion resistance after coating (of the hot-stamped member) after hot stamping further improves. Although the detailed mechanism is not clear, it is considered that, since the above-described elements have an anti-corrosive effect to a corrosion product that is generated in the corrosion test process, it is possible to delay the arrival of a corrosion factor such as water, oxygen, or a salt content at the plating layer 2.

In order to improve the corrosion resistance after coating (of the hot-stamped member) after hot stamping, the total content of Ca, Mg, Sr, and Ti is preferably 0.01% to 20% of the entire plating layer 2 in terms of mass %. The total content of the elements is more preferably 0.03% to 10% of the entire plating layer 2. The upper limit thereof may be set to 6.0%, 4.0%, or 2.0%, and the lower limit thereof may be set to 0.05%, 0.08%, or 0.10%.

The plating layer 2 according to the present embodiment is, for example, a form of a hot-dip plating layer.

(Analysis Method of Plating Layer 2)

In the present embodiment, the components of the plating layer 2 are analyzed by the following method.

In the plated steel sheet 10 according to the present embodiment, since the surface film layer 3 to be described below is formed on the plating layer 2, first, the surface film layer 3 is removed. Specifically, the surface film layer 3 may be removed by polishing. The components of the plating layer 2 are analyzed by the offline fluorescent X-ray method described in Annex JB of JIS G 3314: 2011 from the plating layer 2 exposed on the surface.

(Surface Film Layer 3)

The surface film layer 3 according to the present embodiment is a layer that is formed on the surface of the plating layer 2 as an upper layer and contains A group elements to be described below. The form of the surface film layer 3 according to the present embodiment is typically a form of a coating film, furthermore, a film formed by powder coating (powder-baked layer) or the like, but is not limited to these forms.

The surface film layer 3 contains particles containing one or more elements selected from A group elements (Sc, V, Mn, Fe, Co, Ce, Nb, Mo, and W). These particles are present in the surface film layer 3 in a state of particles mainly containing a simple substance of the A group element or in a state of particles mainly containing a compound (for example, an oxide) of the A group element. The expression "mainly containing" in the present embodiment implies that an impurity or the like that is incorporated at the time of the formation of the particles may also be contained. The structure of the particles differs depending on the manufacturing method of the surface film layer 3. The detailed configuration will be described below for the convenience of description.

The A group elements in the surface film layer 3 are contained in the following forms i to v.

i: A form of particles mainly containing one kind of a simple substance of the A group element ii: A form of particles mainly containing one kind of a simple substance of the A group element and particles mainly containing another kind of a simple substance of the A group element iii: A form of particles mainly containing one kind of a compound of the A group element iv: A form of particles mainly containing one kind of a compound of the A group element and particles mainly containing another kind of a compound of the A group element v: A form of (one or more kinds of) particles mainly containing a simple substance of the A group element and (one or more kinds of) particles mainly containing a compound of the A group element In a case where the surface film layer 3 is a coating film, the "particles" in the surface film layer 3 are present as particles mainly containing a simple substance of the A group element and/or particles mainly containing a compound of the A group element. Such a surface film layer 3 is manufactured by, for example, applying a lacquer containing the above-described particles mixed with an organic binder onto the plating layer 2 and drying the applied coating film by heating as necessary. The organic binder does not need to be particularly limited, and a well-known organic binder or the like can be used.

In a case where the surface film layer 3 is manufactured by powder baking, the "particles" in the surface film layer 3 indicate powder particles. Such a surface film layer 3 is manufactured by, for example, applying a lacquer containing the above-described powder particles mixed with an organic binder onto the plating layer 2 and baking the lacquer.

In a case where the surface film layer 3 contains particles mainly containing a simple substance and/or compound of the A group element, an oxide of the A group element is formed on the surface film layer 3 by a reaction with moisture or oxygen at the interface between the surface film layer 3 and the atmosphere after hot stamping. In the case of an element capable of having plural kinds of stable valence of +1 or higher (for example, trivalent and hexavalent or the like) such as the A group element, electron bias (polarity) in the oxide becomes high. When a component in a chemical conversion liquid, which is, similarly, relatively highly polar, for example, zinc phosphate, is caused to adhere onto such a surface film layer 3, the interaction between the oxide and zinc phosphate becomes stronger, whereby the chemical convertibility improves. In addition, when the chemical convertibility becomes high, the adhesion between a chemical conversion film and the electrodeposition coating film becomes high, and the corrosion resistance after coating improves. The simple substance and compound of the A group element are dissolved in water or salt water, which is a corrosion acceleration factor, in corrosive environments and then form a poorly-soluble compound, which also makes an effect on the enhancement of the corrosion resistance after coating expected.

In addition, since the simple substance and compound of the A group element are present in the surface film layer 3 in a state of particles mainly containing these, the surface area of the surface film layer 3 becomes large compared with surface film layers in which particles of the simple substance and compound of the A group element are not present. When the surface area of the surface film layer 3 becomes large, the time necessary for heating becomes long at the time of hot stamping. In addition, since the A group elements are contained in the surface film layer 3 having a large surface area, the amount of the A group elements present close to an atmosphere where moisture or oxygen is present increases compared with surface film layers having a small surface area (in which the above-described particles are not present). Therefore, the A group elements are likely to be concentrated on the surface of the surface film layer 3 after hot stamping. In such a case, at the time of chemical conversion after hot stamping, for example, at the time of a phosphoric acid treatment, zinc phosphate is likely to adhere to the surface of the surface film layer 3, and the chemical convertibility improves. Therefore, the adhesion after coating of the plated steel sheet for hot stamping 10 improves.

As the total content of the A group elements per 1 $m^2$ of the surface film layer 3 according to the present embodiment, the total content of the individual A group elements per 1 $m^2$ of the surface film layer 3 is 0.01 to 10.0 $g/m^2$. The total content of the individual A group elements means an amount obtained by summing the masses of all kinds of the A group elements that are contained per 1 $m^2$ of the surface film layer 3.

For example, in a case where the surface film layer 3 contains particles containing only Sc as the A group element, the content of the A group element is calculated as described below. In a case where the surface film layer 3 contains particles mainly containing a simple substance of Sc, which is the A group element, or in a case where the surface film layer 3 contains particles mainly containing scandium chloride, which is a compound of Sc, which is an A group element, the content of the A group element per 1 $m^2$ of the surface film layer 3 is the content of Sc per 1 $m^2$ in the surface film layer 3 in both cases. The expression "mainly containing" implies that an impurity other than the A group elements that is incorporated at the time of the formation of the particles may also be contained. Therefore, the "particles mainly containing a simple substance of Sc" indicate particles made up of the simple substance of Sc and an impurity containing no A group elements. In the above-described example, a case where the surface film layer 3 contains particles containing only Sc as the A group element is taken as an example; however, in a case where these particles also contain other A group elements, the weight of each A group element that is contained per 1 $m^2$ of the surface film layer 3 is calculated, and an amount obtained by summing those weights is regarded as the content of the A group elements per 1 $m^2$ in the surface film layer 3.

For example, in a case where the surface film layer 3 contains particles containing Sc and particles containing V as the A group elements, the content of the A group elements per 1 $m^2$ in the surface film layer 3 is calculated as described below. In a case where the surface film layer 3 contains particles mainly containing a simple substance of Sc, which is the A group element, and particles mainly containing vanadium chloride, which is a compound of V, which is an A group element, the content of the A group elements per 1 $m^2$ of the surface film layer 3 is the total amount of Sc and V that are contained per 1 $m^2$ in the surface film layer 3.

When the total content of the A group elements in the surface film layer 3 is less than 0.01 $g/m^2$, a sufficient amount of an oxide of the A group elements is not formed on the surface of the surface film layer 3 after hot stamping, and the chemical convertibility becomes insufficient. Therefore, in a case where the total content of the A group elements in the surface film layer 3 is less than 0.01 $g/m^2$, a sufficient amount of the chemical conversion film is not formed on the surface of the surface film layer 3 even when chemical conversion is performed on the plated steel sheet 10. Therefore, it becomes impossible for the electrodeposition coating film to maintain sufficient adhesion to the chemical conversion film, and the corrosion resistance after coating becomes inferior. Therefore, the total content of the A group elements in the surface film layer 3 is set to 0.01 $g/m^2$ or more from the viewpoint of maintaining the chemical convertibility, but is particularly preferably 0.1 $g/m^2$ or more, 0.2 $g/m^2$ or more, or 0.4 $g/m^2$ or more from the viewpoint of improving the corrosion resistance after coating.

On the other hand, when the total content of the A group elements in the surface film layer 3 becomes more than 10.0 $g/m^2$, the corrosion resistance after coating is saturated, which causes an increase in the cost. Therefore, the total content of the A group elements in the surface film layer 3 of the present embodiment is set to 10.0 $g/m^2$ or less. When the amount of the A group elements added and the effect of the A group elements are taken into account, the total content thereof is preferably 6.0 g/m² or less, 3.0 g/m² or less, or 2.0 g/m² or less from the viewpoint of cost-effectiveness.

The average grain diameter of the particles containing the A group elements in the surface film layer 3 according to the present embodiment is 0.05 to 3.0 μm. When the average grain diameter of the particles containing the A group elements is within the above-described range, it is possible to improve the chemical convertibility while maintaining the corrosion resistance of the surface film layer 3.

When the average grain diameter of the particles containing the A group elements is more than 3.0 μm, since the surface area per volume of the particles mainly containing a simple substance of the A group element and/or the particles mainly containing a compound of the A group element is small, the surface area of the surface layer of the surface film layer 3 becomes insufficient. Therefore, the amount of an oxide of the A group elements that is formed on the surface of the surface film layer 3 after hot stamping becomes insufficient, and the chemical convertibility of the plated steel sheet 10 does not improve. As a result, a desired corrosion resistance after coating cannot be obtained. From the viewpoint of improving the chemical convertibility by improving the surface area of the surface film layer 3, the average grain diameter of the particles containing the A group elements is preferably 2.0 μm or less, 1.5 μm or less, 1.1 μm or less, or 0.7 μm or less and particularly preferably 0.5 μm or less. On the other hand, when the average grain diameter is less than 0.05 μm, since the surface area of the particles mainly containing a simple substance of the A group element and/or the particles mainly containing a compound of the A group element becomes too large, the particles serve as an invasion path of water or a salt content in corrosive environments. Therefore, a desired corrosion resistance after coating cannot be obtained. Therefore, the average grain diameter of the particles containing the A group elements is set to 0.05 μm or more. The average grain diameter of the particles may be set to 0.07 μm or more, 0.1 μm or more, or 0.2 μm or more as necessary.

Among the A group elements, Sc, Mn, Fe, Co, Nb, Mo, and W are particularly excellent in terms of the corrosion resistance after coating. Although the mechanism is not clear in detail, it is presumed that this is because these elements do not only exhibit an action of improving the chemical convertibility, but are also excellent in terms of an action of being adsorbed to the plating layer 2 at the time of being dissolved in water, which is a corrosion factor, in corrosive environments, and thus a corrosion-suppressing effect such as the prevention of reactions of the above-described formulae (1) to (3) is exhibited. Therefore, only Sc, Mn, Fe, Co, Nb, and W may be regarded as the A group elements. If necessary, only specific elements among these elements may be regarded as the A group elements.

Examples of compounds of the A group elements include oxides, chlorides, sulfides, fluorides, hydroxides, carbides, nitrides, and the like. Specific examples thereof include scandium oxide, scandium bromide, scandium chloride, scandium fluoride, scandium hydroxide, silicon carbide, titanium chloride, barium titanate, vanadyl acetylacetonate, vanadium acetylacetonate, vanadyl acetate, vanadyl sulfate, vanadium pentoxide, vanadium trioxide, vanadium dioxide, ammonium metavanadate, sodium metavanadate, potassium metavanadate, potassium permanganate, ammonium permanganate, iron oxide, iron nitrate, iron sulfate, iron hydroxide, cobalt chloride, cobalt acetate, cobalt oxide, cerium oxide, cerium chloride, cerium nitrate, cerium sulfate, cerium acetate, cerium oxalate, cerium hydroxide, niobium oxide, potassium niobate, lithium niobate, niobium nitride, molybdenum oxide, ammonium molybdate, potassium molybdate, tungsten oxide, ammonium tungstate, potassium tungstate, tungsten sulfide, hydrates of the above-described compounds, and the like, but the compounds are not limited thereto.

Since the surface film layer 3 preferably contains oxygen, at least some of the particles containing the A group elements preferably contain an oxygen atom (O). In a case where the particles containing the A group elements in the surface film layer 3 contain an oxygen atom, that is, in a case where the surface film layer 3 contains particles mainly containing an oxide of the A group elements, the chemical convertibility of the plated steel sheet 10 further improves. In the present embodiment, the fact that at least some of the particles containing the A group elements contain oxygen indicates that 30% or more of the particles containing the A group elements of all of the particles containing the A group elements in the surface film layer 3 contain an oxygen atom.

Although there is an unclear point regarding the detailed mechanism of the chemical convertibility further improving in a case where at least some of the particles containing the A group elements contain an oxygen atom, the present inventors presume as described below.

Since the particles mainly containing a compound (oxide) of the A group elements contain an oxygen atom having a relatively high electronegativity, the electron bias in the compound among the particles becomes higher (the polarity becomes higher). When the electron bias in the compound among the particles becomes higher, the affinity between a component that is the main component in the chemical conversion liquid and is, similarly, highly polar, for example, zinc phosphate, and the compound of the A group element becomes higher, which makes the chemical convertibility improve. In addition, the improvement in the chemical convertibility makes an effect on improvement in the adhesion of the coating film expected. Furthermore, in a case where at least some of the particles containing the A group elements contain an oxygen atom, the oxygen atom exhibits basicity at the time of being dissolved in the chemical conversion liquid. Therefore, the pH of the chemical conversion liquid near the surface of the surface film layer 3 rises, and the precipitation of a component such as zinc phosphate on the surface of the surface film layer 3 is accelerated. Therefore, the effect on improvement in the chemical convertibility of the surface film layer 3 is developed. In addition, in a case where the particles containing the A group elements contain an atom other than oxygen such as sulfur or nitrogen, when the atom other than oxygen is oxidized by heating during hot stamping, there is a concern that a volatile gas may be generated, which may contaminate a facility or may degrade working environments. However, in a case where the particles containing the A group elements contain an oxygen atom, the amount of gas that is volatilized by heating during hot stamping is extremely small.

When the surface film layer 3 according to the present embodiment further contains particles containing one or more of B group elements consisting of Zn, Zr, and Ti in addition to the particles mainly containing a simple substance and/or compound of the A group element, it is possible to further improve the corrosion resistance after coating after hot stamping. This is because, when a hot-stamped member is exposed to corrosive environments, a compound of the B group elements develops a barrier function against a corrosion factor such as water, oxygen, or a salt content and acts as resistance to corrosion. In the present embodiment, the particles containing the B group elements are present in the surface film layer 3 in a state of mainly containing a compound of the B group elements.

In the surface film layer 3 according to the present embodiment, the total content of the B group elements consisting of Zn, Zr, and Ti is preferably 0.01 to 10.0 g/m$^2$. The total content of the B group elements means an amount obtained by summing the masses of all kinds of the B group elements that are contained per 1 m$^2$ of the surface film layer 3.

For example, in a case where the surface film layer 3 contains particles containing only Zn as the B group element, the total content of the B group elements is calculated as described below. In a case where the surface film layer 3 contains particles mainly containing zinc oxide, which is a compound of Zn, which is the B group element, the total content of the B group elements in the surface film layer 3 is the content of Zn in the surface film layer 3.

In addition, in a case where the surface film layer 3 contains particles containing Zn and particles containing Zr as the B group elements, the total content of the B group elements in the surface film layer 3 is calculated as described below. In a case where the surface film layer 3 contains particles mainly containing zinc oxide, which is a compound of Zn, which is the B group element, and particles mainly containing zirconium ammonium carbonate, which is a compound of Zr, which is the B group element, the total content of the B group elements is the total of the content of Zn and the content of Zr in the surface film layer 3.

When the total content of the B group elements is set within the above-described range, it is possible to further improve the corrosion resistance after coating after hot stamping. The lower limit of the total content of the B group elements is more preferably 0.03 g/m$^2$, 0.05 g/m$^2$ or 0.1 g/m$^2$, and still more preferably 0.2 g/m$^2$. The upper limit of the total content of the B group elements is more preferably 3.0 g/m$^2$, 2.0 g/m$^2$, or 1.0 g/m$^2$, and still more preferably 0.8 g/m$^2$ or 0.7 g/m$^2$.

Examples of compounds of the B group elements (Zn, Zr, and Ti) include oxides, bromides, chlorides, sulfides, fluorides, hydroxides, carbides, nitrides, and the like. Specific examples thereof include zinc oxide, zinc chloride, zinc fluoride, zinc phosphate, zinc dihydrogen phosphate zinc hydroxide, zirconium oxide, zirconium fluoride, ammonium hexafluorozirconate, zirconium ammonium carbonate, titanium oxide, fluorotitanic acid, ammonium hexafluorotitanate, and the like, but the compounds are not limited thereto.

The form of the surface film layer 3 in the case of containing the particles mainly containing a compound of the B group elements in addition to the particles mainly containing a simple substance of the A group element and/or the particles mainly containing a compound of the A group element is typically a form of a coating film, a film by powder coating (powder-baked layer), or the like, but is not limited to these forms.

In a case where the surface film layer 3 is a coating film containing the B group elements, the surface film layer 3 is a coating film containing the particles mainly containing a simple substance and/or compound of the A group element and the particles mainly containing a compound of the B group element. This coating film may contain an organic binder in addition to the particles mainly containing a simple substance and/or compound of the A group element and the particles mainly containing a compound of the B group element.

In a case where the surface film layer 3 is a powder-baked layer, the surface film layer 3 is a powder-baked layer containing the particles mainly containing a simple substance and/or compound of the A group element and the particles mainly containing a compound of the B group element. In this case as well, the powder-baked layer may contain an organic binder.

The film thickness of the surface film layer 3 according to the present embodiment is not particularly limited, but is preferably set to 0.1 to 2.5 μm. The lower limit of the film thickness thereof may be set to 0.3 μm, 0.5 μm, or 0.8 μm, and the upper limit thereof may be set to 2.2 am, 1.8 μm, or 1.5 μm.

(Analysis Method of Surface Film Layer 3)

In a case where the surface film layer 3 is a coating film or a powder-baked layer, the content (the total amount of individual elements) of the A group elements (or the A group elements and the B group elements) in the surface film layer 3 can be measured by the offline fluorescent X-ray method described in Annex JB of JIS G 3314: 2011. Specifically, the strengths of the offline fluorescent X-ray method are measured in a visual field having a diameter of 30 mm. Next, the masses of each A group element and/or each B group element that are contained per 1 m$^2$ are calculated using the strengths and the calibration curves of each A group element and/or each B group element prepared in advance. These masses of each A group element and/or each B group element are summed, whereby the amount of the A group elements and/or the B group elements per 1 m$^2$ of the surface film layer 3 can be obtained.

The average grain diameter of the particles mainly containing a simple substance and/or compound of the A group element in the surface film layer 3 is measured by the following method.

A 20 mm×20 mm-sized sample is cut out from a portion 10 mm or more apart in the width direction, specifically, for example, a site 15 mm apart from the end of the plated steel sheet 10, and the surface of the sample is used as an observed section. Five or more 100 μm×100 μm observed visual fields are observed using a field-emission scanning electron microscope (FE-SEM) at an acceleration voltage of 15 kV and a magnification of 10000 times. Particles in the observed visual fields are analyzed using an external energy dispersive analyzer (EDX), thereby determining whether or not the particles are particles mainly containing a simple substance and/or compound of the A group element. The grain diameters of the particles mainly containing a simple substance and/or compound of the A group element were obtained using an observation photograph of the above-described observed visual fields by an intercept method in which a circular test line described in Annex C of JIS G 0551: 2013 is used. The average of the grain diameters of all of the particles mainly containing a simple substance and/or compound of the A group element in the observation photograph is calculated, whereby the average grain diameter of the particles mainly containing a simple substance and/or compound of the A group elements in the surface film layer 3 is obtained.

In the present embodiment, regarding the particles containing the A group elements (particles mainly containing a simple substance and/or compound of the A group element) in the surface film layer 3, there is a case where the particles are present as primary particles, which are particles formed by the growth of a single crystal nucleus, and a case where the particles are present as secondary particles, which are aggregates of the primary particles. Therefore, the average grain diameter of the particles containing the A group elements in the present embodiment is obtained by measuring the grain diameter of one particle (primary grain diameter) in a case where only primary particles are present and obtained by measuring the grain diameter of a secondary particle (secondary grain diameter) in a case where the particles are present as secondary particles.

In the 100 μm×100 μm observed visual fields in a cross-sectional image captured with the scanning electron microscope, the average value of the major axis and minor axis of each particle (particle mainly containing a simple substance/or compound of the A group element) is calculated for all of the particles in the visual fields, and the average value thereof is calculated, thereby obtaining the average grain diameter.

The differentiation of the primary particle and the secondary particle can be determined from, for example, the presence or absence of a boundary (difference in luminosity) in particles in a scanning electron microscopic image or, when measured on an electron diffraction image with a transmission electron microscope, the particles are regarded as primary particles if the crystal orientations are the same orientation and are determined as mutually different primary particles if the crystal orientations are different.

(Hot-Stamped Member)

A hot-stamped member having a tensile strength of approximately 1000 Mpa or more can be obtained by heating and quenching the above-described plated steel sheet for hot stamping 10 by the hot stamping method. In addition, in the hot stamping method, since it is possible to perform pressing on the plated steel sheet in a state of being softened at a high temperature, it is possible to easily form the plated steel sheet.

Since the plated steel sheet for hot stamping 10 according to the present embodiment contains the A group elements in the surface film layer 3 on the outermost layer side, an oxide film layer containing the A group elements is formed on the surface film layer 3 by a reaction with moisture or oxygen at the interface between the surface film layer 3 and the atmosphere after hot stamping. This oxide film layer contains one or more elements selected from the A group elements consisting of Sc, V, Mn, Fe, Co, Ce, Nb, Mo, and W, Al, and oxygen. That is, the hot-stamped member according to the present embodiment has an oxide film layer containing one or more elements selected from the A group elements consisting of Sc, V, Mn, Fe, Co, Ce, Nb, Mo, and W, Al, and oxygen on the surface. Regarding the hot stamped member, in automobile manufacturing steps, a chemical conversion film represented by a zinc phosphate film, an electrodeposition coating film, and furthermore, depending on cases, a coating film are laminated in order on the surface of the member (on the surface film layer 3). In the A group elements, the electron bias (polarity) in the oxide becomes high. When a component in a chemical conversion liquid, which is, similarly, relatively highly polar, for example, zinc phosphate, is caused to adhere onto such a surface film layer 3, the interaction between the oxide and zinc phosphate becomes stronger, whereby the chemical convertibility improves. In addition, when the chemical convertibility becomes high, the adhesion between a chemical conversion film and the electrodeposition coating film becomes high, and the corrosion resistance after coating improves. The simple substance and compound of the A group element are dissolved in water or salt water, which is a corrosion acceleration factor, in corrosive environments and then form a poorly-soluble compound, which also makes an effect on the enhancement of the corrosion resistance after coating expected.

(Manufacturing Method of Plated Steel Sheet for Hot Stamping 10)

A manufacturing method of the plated steel sheet 10 according to the present embodiment will be described below.

The plating layer 2 is formed on either surface or both surfaces of the steel sheet 1 by, for example, a hot-dip plating method using the steel sheet 1 having predetermined chemical compositions. The plating bath temperature needs to be set to 550° C. to 700° C.

Immediately after a plating is applied to either surface or both surfaces of the steel sheet 1 by the above-described method, particles are sprayed to the surface of the plating layer 2. Spraying the particles before the solidification of the plating layer 2 inhibits the growth of metal crystals in the plating layer and makes it possible to decrease the grain diameters of metal crystal particles in the plating layer 2. When the surface film layer 3 is formed on the plating layer 2 by decreasing the grain diameters of the metal crystal particles in the plating layer 2 as described above, the crystal particles in the surface film layer 3 in the interface with the plating layer 2 become small due to the influence of the sizes of the crystal particles in the plating layer 2. Therefore, the growth of crystal particles in the surface film layer 3 that is formed on the interface is also inhibited, accordingly, it is possible to decrease the grain diameters of the particles (a simple substance and/or compound of the A group element) in the surface film layer 3 and to increase the surface area of the surface film layer 3. When the surface area of the surface film layer 3 is increased, the chemical convertibility improves at the time of the chemical conversion after hot stamping, whereby the adhesion after coating improves.

In the spraying of the particles to the surface of the plating layer 2, a metal oxide having an average grain diameter of 20 μm or less (titanium oxide, magnesium oxide, vanadium oxide, chromium oxide, manganese oxide, cobalt oxide, nickel oxide, copper oxide, zirconium oxide, silicon dioxide, zinc oxide, iron oxide, or aluminum oxide) is preferably sprayed together with a cooling gas at a speed of 30 to 70 m/s. The sprayed particles become crystal nuclei and have an effect of cooling plating metal in a molten state at the same time. The number of crystal grain boundaries can be increased by controlling the average crystal grain diameter in the plating layer to be small. As a result, it is presumed that the number of the grain boundaries increases even after hot stamp heating, and more unevennesses are also formed on the oxide film layer in the surface layer, and thus the physical and chemical bonds with the electrodeposition coating film after the chemical conversion become strong. When the spraying speed of the particles is slower than 30 m/s, the number of crystal nuclei is decreased. As a result, the crystal grain diameters become large even after hot stamping, the physical and chemical bonds with the electrodeposition coating film cannot be ensured, and the lacquer adhesion and the corrosion resistance after coating are poor. On the other hand, when the spraying speed of the particles is faster than 70 m/s, the number of crystals is excessively increased by the spraying of the particles, and the crystals become too small. Therefore, the dissolution rate in corrosion test liquids or the like becomes relatively fast even when an upper layer film is imparted and the chemical conversion and the electrodeposition coating film are imparted, and thus the lacquer adhesion and the corrosion resistance after coating are poor. A spray nozzle is desirably used in order to uniformly spray the particles on the surface of the plating layer 2, but the spraying method is not limited thereto.

The hot-stamped member according to the present embodiment may also be manufactured by forming an Al-coated layer containing the A group elements by causing Al and the A group elements to adhere to the surface of the steel sheet 1 by deposition or hot spraying instead of hot-dip plating and, furthermore, hot-stamping the steel sheet having this Al-coated layer.

In addition, as an example of the forming method of the Al-coated layer, Al may be caused to adhere to the steel sheet 1 first by deposition or hot spraying, and then the A group elements may be caused to adhere to the steel sheet. This forms an Al-coated layer including an Al layer and the A group elements.

In addition, as another example of the forming method of the Al-coated layer, Al and the A group elements may be caused to adhere to the steel sheet 1 at the same time by performing deposition or hot spraying using a deposition source or hot spraying source containing the A group elements. The proportion of the A group elements in the Al-coated layer is preferably 0.001% to 30 mass %.

After that, similar to the case of the plated steel sheet for hot stamping 10, hot stamping is performed on the steel sheet having the Al-coated layer, whereby a hot-stamped member made of the plated steel sheet for hot stamping can be manufactured.

The forming method of the surface film layer 3 is not particularly limited, but the surface film layer 3 can be formed by, for example, the following method.

A method in which a solution or suspension containing the particles mainly containing a simple substance and/or compound of the A group element (or the above-described particles and the particles mainly containing a compound of the B group element) [to] is coated onto the surface of the plating layer 2, a drying treatment is performed as necessary, and the surface film layer 3 is formed as a coating film. Here, the solution or suspension preferably contains an organic binder.

A method in which the surface film layer 3 is formed as a powder-baked layer by powder coating on the steel sheet 1 on which the plating layer 2 has been formed using powder of the particles mainly containing a simple substance and/or compound of the A group element (or the above-described particles and the particles mainly containing a compound of the B group element).

A predetermined organic binder may be mixed with the solution or suspension containing the particles mainly containing a simple substance and/or compound of the A group element (or the above-described particles and the particles mainly containing a compound of the B group element) as necessary. Examples of the organic binder include polyurethane-based resins, polyester-based resins, acrylic resins, silane coupling agents, and the like. The majority of these organic binders disappear in a hot stamping heating step.

<Manufacturing Method of Hot-Stamped Member>

Hot stamping is performed on the plated steel sheet for hot stamping 10 manufactured as described above. In the hot stamping method, the plated steel sheet for hot stamping 10 is blanked (punched) as necessary, and then the plated steel sheet for hot stamping 10 is heated and softened. In addition, the softened plated steel sheet for hot stamping 10 is pressed to be formed and then cooled (quenched). In the heated and quenched hot-stamped member, it is possible to obtain a high tensile strength of approximately 1000 Mpa or more. As the heating method, it is possible to employ infrared heating or the like in addition to an ordinary electric furnace or an ordinary radiant tube furnace.

The heating temperature and the heating time during the hot stamping are preferably set to 850° C. to 950° C. for 2 minutes or longer in the case of the atmosphere. When the heating time is shorter than 2 minutes, the tensile strengths of hot-stamped parts do not become sufficiently high.

The upper limit of the heating time does not need to be limited, but is preferably 10 minutes or shorter. This is because, when the heating time is longer than 10 minutes, the productivity becomes poor, which is economically disadvantageous.

The number of crystal grain boundaries can be increased by controlling the average crystal grain diameter in the plating layer to be small. As a result, it is presumed that the number of the grain boundaries increases even after hot stamp heating, and more grain boundaries or unevennesses are also formed on the upper layer film, and thus the physical and chemical bonds with the electrodeposition coating film after the chemical conversion become strong.

EXAMPLES

Hereinafter, examples of the present invention will be described, but conditions in the examples are simply examples employed to confirm the feasibility and effect of the present invention, and the present invention is not limited to these condition examples. The present invention is capable of employing a variety of conditions within the scope of the gist of the present invention as long as the object of the present invention is achieved.

Table 1 shows the chemical compositions of steel sheets used for steel sheets for hot stamping of the present examples.

TABLE 1

| Steel sheet | Chemical compositions (mass %), remainder of Fe and impurity | | | | | | | | |
|---|---|---|---|---|---|---|---|---|---|
| | C | Si | Mn | P | S | Al | Ti | B | N |
| S1 | 0.10 | 0.21 | 1.21 | 0.025 | 0.005 | 0.05 | 0.025 | 0.0030 | 0.0054 |
| S2 | 0.44 | 0.01 | 1.01 | 0.017 | 0.016 | 0.03 | 0.041 | 0.0022 | 0.0042 |
| S3 | 0.25 | 0.60 | 0.92 | 0.032 | 0.011 | 0.04 | 0.023 | 0.0025 | 0.0056 |
| S4 | 0.32 | 0.01 | 0.01 | 0.044 | 0.017 | 0.04 | 0.025 | 0.0022 | 0.0053 |
| S5 | 0.26 | 0.64 | 3.00 | 0.031 | 0.004 | 0.01 | 0.028 | 0.0030 | 0.0034 |
| S6 | 0.28 | 0.21 | 1.01 | 0.047 | 0.004 | 0.01 | 0.021 | 0.0030 | 0.0055 |
| S7 | 0.30 | 0.21 | 0.95 | 0.012 | 0.021 | 0.03 | 0.023 | 0.0030 | 0.0057 |
| S8 | 0.32 | 0.67 | 1.01 | 0.014 | 0.004 | 0.11 | 0.025 | 0.0025 | 0.0041 |
| S9 | 0.24 | 0.21 | 0.95 | 0.035 | 0.004 | 0.03 | 0.011 | 0.0029 | 0.0054 |
| S10 | 0.26 | 0.23 | 0.92 | 0.017 | 0.004 | 0.03 | 0.136 | 0.0087 | 0.0052 |
| S11 | 0.27 | 0.25 | 0.95 | 0.012 | 0.004 | 0.01 | 0.044 | 0.0001 | 0.0031 |
| S12 | 0.33 | 0.21 | 2.01 | 0.017 | 0.004 | 0.01 | 0.035 | 0.0142 | 0.0042 |
| S13 | 0.35 | 0.03 | 0.98 | 0.029 | 0.014 | 0.01 | 0.029 | 0.0048 | 0.0144 |
| S14 | 0.31 | 0.01 | 0.95 | 0.022 | 0.017 | 0.03 | 0.022 | 0.0025 | 0.0051 |
| S15 | 0.28 | 0.21 | 0.96 | 0.043 | 0.014 | 0.03 | 0.023 | 0.0025 | 0.0052 |

For each of the steel sheets shown in Table 1, a plating layer was formed on either surface or both surfaces of the steel sheet by a hot-dip plating method. The plating bath temperature at the time of hot-dip plating was set to 550° C. to 700° C., the steel sheet was immersed in the plating bath, and then a metal oxide (aluminum oxide) having an average grain diameter of 1 to 10 μm was sprayed to the surfaces of the plating layers using a spray nozzle under conditions shown in Tables 2-1 to 3-7. However, in the reference numerals a1, a4, and a5 in Table 2-3, the spraying was not performed. Regarding the spraying, in the tables, "Yes" was entered for examples where the spraying was performed, and "No" was entered for examples where the spraying was not performed.

After that, the adhesion amounts of plating were adjusted by a gas wiping method such that the adhesion amounts of plating became 80 g/m² per surface. At this time, the thicknesses of the plating layers are as shown in Tables 2-1 to 3-7. Furthermore, as shown in Tables 2-1 to 3-8, surface film layers containing particles mainly containing a simple substance and/or compound of an A group element or surface film layers not containing these particles and, furthermore, surface film layers containing particles mainly containing a simple substance and/or compound of an A group element and particles mainly containing a compound of a B group element were formed on the plating layers, thereby obtaining plated steel sheets. In addition, in some of the plated steel sheets, the compositions of the plating layers were changed.

In examples containing the particles mainly containing the simple substance of the A group element (reference numerals A1 to A7), a lacquer containing particles mainly containing a simple substance of an A group element and an organic binder dispersed or dissolved in water was applied with a roll coater and then dried at a reached sheet temperature of 80° C., thereby forming surface film layers.

In examples containing the particles mainly containing the compound of the A group element or the particles mainly containing the compound of the A group element and the particles mainly containing the compounds of the B group element (reference numerals A8 to A51, reference numerals a4, a6, a8, and a10 to 12, and reference numerals B1 to B85), a lacquer containing a compound, such as a chloride or an oxide, of an A group element and an organic binder dispersed or dissolved in water was applied with the roll coater and then dried at a reached sheet temperature of 80° C., thereby forming surface film layers.

In examples containing the particles mainly containing the simple substance of the A group element and the particles mainly containing the compound of the B group element (reference numerals B86 to B112), a lacquer containing particles mainly containing a simple substance of an A group element, a compound, such as a chloride or an oxide, of a B group element, and an organic binder dispersed or dissolved in water was applied with a roll coater and then dried at a reached sheet temperature of 80° C., thereby forming surface film layers.

In examples not containing the particles containing the A group element (reference numerals a1 to a3, a7, and a9), a lacquer containing aluminum oxide and an organic binder dispersed or dissolved in water was applied with a roll coater and then dried at a reached sheet temperature of 80° C., thereby forming surface film layers. In reference numerals A52 and A53 in Table 2-2, a lacquer in which particles containing an A group element and powder particles containing an organic binder were mixed together was sprayed onto the plating layers and heated up to 200° C., thereby forming surface film layers.

In Tables 2-1 and 2-2, the reference numerals A1 to A7 are invention examples in which the surface film layers containing the particles mainly containing the simple substance of the A group element were formed, the reference numerals A8 to A15 are invention examples in which the formed surface film layers contained the particles mainly containing the compound of the A group element, but these particles did not contain oxygen, the reference numerals A16 to A47 are invention examples in which the surface film layers were formed of the particles mainly containing a compound containing the A group element and oxygen, and the reference numerals A48 to A51 are invention examples in which surface film layers containing two or more kinds of particles mainly containing the A group element (particles mainly containing a simple substance and/or a compound) were formed. The reference numerals A52 and A53 are invention examples in which surface film layers containing an organic binder and powder particles containing molybdenum oxide or tungsten oxide were formed.

Regarding the examples in which the surface film layers containing two or more kinds of particles mainly containing the simple substance and/or compound of the A group element were formed (reference numerals A48 to A51), numbers of (1), (2) . . . were given to individual simple substances or individual compounds, and the individual elements and the like are entered into the tables.

The reference numerals a1 to a3, a7, and a9 in Table 2-3 are comparative examples in which surface film layers containing no particles mainly containing a simple substance and/or compound of an A group element were formed, the reference numerals a4, a11, and a12 are comparative examples in which the contents of the A group elements (total amounts in terms of the elements) were insufficient, the reference numeral a5 was a comparative example in which no surface film layer was laminated, the reference numerals a6 and a8 are comparative examples in which the thicknesses of the plating layers were small, and the reference numeral a10 is a comparative example in which the average crystal grain diameter in the plating layer was large.

The reference numerals B1 to B112 in Tables 3-1 to 3-8 are invention examples in which the surface film layers containing one or more of the particles mainly containing the simple substance and/or compound of the A group element and the particles mainly containing the compound of the B group element were formed. Regarding the examples in which two or more kinds of particles mainly containing the compound of the B group element were contained (reference numerals B41 to B85 and B95 to B112), numbers of (1), (2) . . . were given to individual compounds, and elements and the like that configured the individual compounds are entered into the tables.

The reference numerals C1 to C24 in Table 4 are invention examples in which the plating compositions were changed.

The analysis results of the plated steel sheets shown in Table 2-1 to Table 4 were obtained by the following individual methods.

(Analysis Method of Surface Film Layer)

The content (total amount in terms of elements) of the A group elements (or the A group elements and the B group elements) in the surface film layer was measured by the offline fluorescent X-ray method described in Annex JB of JIS G 3314: 2011. First, the relationship between the fluorescent X-ray strength of a known oxide film and the amount thereof was prepared in advance as a calibration curve. Since there is one-to-one correspondence between the fluorescent X-ray strength and the amount in this calibration curve, the content is specified once the fluorescent X-ray strength is determined. Next, the strengths of the fluorescent X-rays of the A group elements and/or the B group elements that were emitted when a sample having a diameter of 30 mm was irradiated with X-rays were measured. The contents of each A group element and/or each B group element (g/m²) were calculated by calculating the contents corresponding to the strengths of these fluorescent X rays from the above-described calibration curve, and the total amount of the contents of each A group element and/or each B group element (g/m²) was calculated, thereby obtaining the content of the A group elements and/or the B group elements. The contents of the A group elements (or the A group elements and the B group elements) obtained as described above are shown in the tables. In a case where 30% or more of the particles containing the A group elements in the surface film layer contained an oxygen atom, "Yes" was entered into the "Oxygen atom contained" columns.

A 20 mm×20 mm-sized sample was cut out from a portion 10 mm or more apart from the end portion of the plated steel sheet 10, and the surface of the sample was used as an observed section. Five visual fields of 100 µm×100 m observed visual fields were observed using a field-emission scanning electron microscope (FE-SEM). Particles in the observed visual fields were analyzed using an energy dispersive analyzer (EDX) externally attached to an FE-SEM, thereby determining whether or not the particles were particles mainly containing a simple substance and/or compound of the A group element. An element that the particles mainly contained was entered into the "element" columns in the tables. In addition, in a case where the element that the particles mainly contained was contained in a simple substance state, "simple substance" was entered into the "simple substance or compound" columns in the tables, and, in a case where the element was contained in a compound state, the kind of the compound was entered into the columns.

In the 100 µm×100 µm observed visual fields in a cross-sectional image captured with the scanning electron microscopic image, the average value of the major axis and minor axis of each particle (particle mainly containing a simple substance/or compound of the A group element) was calculated for all of the particles in the visual fields, and the average value thereof was calculated, thereby obtaining the average grain diameter of the particles mainly containing the simple substance and/or compound of the A group element in the surface film layer. The obtained average grain diameters of the particles mainly containing the simple substance and/or compound of the A group element are shown in the tables.

Primary particles and secondary particles were determined from the presence or absence of a boundary (difference in luminosity) in particles in a scanning electron microscopic image.

(Analysis Method of Plating Layer)

The surface film layer on the plating layer was removed by polishing. The components of the plating layer were analyzed by the offline fluorescent X-ray method described in Annex JB of JIS G 3314: 2011 from the plating layer exposed on the surface. The obtained components (plating composition) of the plating layer are shown in the table. The remainder of the chemical compositions of the plating layer was less than 0.5% of an impurity. For example, an example for which "Al-10% Si" was entered into the table regarding the chemical compositions (plating composition) of the plating layer indicates that the plating layer contained Al, 10% of Si, and less than 0.5% of an impurity.

(Measuring Method of Thickness t of Plating Layer)

The thickness t of the plating layer was measured, for example, by performing a quantitative analysis on a cross section with a field emission electron probe microanalyzer (FE-EPMA). As a sample, a 10 mm×10 mm-sized sample was cut out from a site 15 mm apart from the end portion of the plated steel sheet 10 in the width direction. The sample was embedded in a resin and polished to obtain an embedded and polished sample. Carbon was deposited on the embedded sample so that the sample was easily energized, and then a point analysis was performed using an FE-EPMA magnification at an acceleration voltage of 10 kV and a magnification of 1500 times or more, thereby quantitatively analyzing the content of each element. A point where the Al content became 30 mass % of the total of elements excluding mass carbon was regarded as the plating layer. The point analysis was performed every 1 µm perpendicularly to the steel sheet from the plating surface toward the center of the sheet thickness, and points where the Al content was less than 30 mass % were determined to be not the plating layer. In addition, the collection of points where the Al content was 30 mass % or more is regarded as the plating layer, and the thickness t of the plating layer was measured. The obtained thicknesses t of the plating layers were entered into columns in the tables of "plating thickness" in the tables.

(Measuring Method of Average Crystal Grain Diameter of Plating Layer)

A sample was collected from the plated steel sheet for hot stamping such that a cross section of the plating layer in the thickness direction served as an observed section. The collected sample was etched with a 3% nitric acid alcohol solution (Nital solution) to cause crystal grain boundaries to appear, and an image was captured using a scanning electron microscope (SEM) so as to include a range from the outermost surface of the plating layer to the steel sheet. At this time, a layer where the Al content was 60 mass % or more was determined as a plating layer by energy dispersive X-ray analysis (EDX). A line segment having a length of 2t/3 (t=the thickness (µm) of the plating layer) was drawn in the thickness direction from the interface between the plating layer 2 and the surface film layer (not shown) on this photograph as shown in FIG. 2, the number of intersection points with grain boundaries was represented by n, and the value obtained by dividing the line segment length (2t/3) by n, that is, (2t/3n) was regarded as the average crystal grain diameter. Three line segments were drawn as described above at random positions at intervals of 5 µm as shown by (a), (b), and (c) in FIG. 2, the average crystal grain diameters were obtained at the positions of the individual line segments, and a value obtained by converting the average crystal grain diameters into an average value was regarded as the average crystal grain diameter of the plating layer in the thickness range from the interface between the plating layer and the surface film layer to the position at ⅔ of the thickness t (2t/3 position).

In a case where n is 0, it is not possible to calculate 2t/3n. However, in a case where n was 0, this was a case where the grain diameters were larger than 2t/3 in the observation image, and thus the average crystal grain diameter was determined to be not 2t/3 or less.

In addition, in the calculation of the number n of the intersection points, as described in Annex C.2.2 of JIS G 0551: 2013, in a case where a line segment intersected with a triple point, n was regarded as 1.5 at that point.

The plated steel sheets shown in Table 2-1 to Table 4 were heated at 940° C. for 6 minutes and then formed with a die and simultaneously cooled in the die, thereby obtaining hot-stamped members. The heating was performed in a wet atmosphere having a dew point of 40° C.

Regarding the obtained hot-stamped members, the chemical convertibility and corrosion resistance after coating were investigated and evaluated by the following methods. The hot-stamped members of the examples had an oxide film layer containing one or more elements selected from the A group elements consisting of Sc, V, Mn, Fe, Co, Ce, Nb, Mo, and W, Al, and oxygen on the surfaces.

(1) Chemical Convertibility

The hot-stamped members were cut into 150 mm×70 mm, chemical conversion was performed on test pieces with a chemical conversion liquid (PB-SX35) manufactured by Nihon Parkerizing Co., Ltd., and then the amounts of zinc phosphate were measured with a fluorescent X-ray analyzer. The chemical convertibility was evaluated with the following grades X1 to X4 according to the amounts of zinc phosphate obtained by the measurement. In a case where the grades of the chemical convertibility were X1, X2, or X3, the hot-stamped members were regarded as being excellent in terms of the chemical convertibility and determined as pass. In a case where the grade of the chemical convertibility was X4, the hot-stamped members were regarded as being poor in the chemical convertibility and determined as fail.

[Grades of chemical convertibility depending on amount of zinc phosphate]

X1: 0.7 $g/m^2$ or more
X2: 0.3 $g/m^2$ or more and less than 0.7 $g/m^2$
X3: 0.1 $g/m^2$ or more and less than 0.3 $g/m^2$
X4: Less than 0.1 $g/m^2$ (2) Corrosion Resistance after Coating The hot-stamped members were cut into 150 mm×70 mm, chemical conversion was performed on test pieces with a chemical conversion liquid (PB-SX35) manufactured by Nihon Parkerizing Co., Ltd., and then an electrodeposition lacquer (POWERNICKS 110) manufactured by Nippon Paint Industrial Coatings Co., Ltd. was coated such that the coating film thicknesses became 20 μm and baked at 170° C. The corrosion resistance after coating of the test pieces was investigated in accordance with the method specified in Japanese Industrial Standard JIS H 8502. Specifically, a phosphorylation chemical conversion and cationic electrodeposition coating (thickness: 20 microns) were performed on each sample, a defect was given to a coating film with a cutter, and the width (maximum value on one side) of the coating film swelling from the cut defect after 180 cycles of a corrosion test by a neutral salt water spraying cycle testing method in which 2-hour spraying of 5% salt water, 4-hour drying, and 2-hour wet environment were regarded as one cycle was measured. The corrosion resistance after coating was evaluated with the following grades Y1 to Y4 according to the measurement results. In a case where the grades of the corrosion resistance after coating were Y1, Y2, or Y3, the hot-stamped members were regarded as being excellent in terms of the corrosion resistance after coating and determined as pass. In a case where the grade of the corrosion resistance after coating was Y4, the hot-stamped members were regarded as being poor in the corrosion resistance after coating and determined as fail.

[Grades of Corrosion Resistance after Coating]

Y1: The swollen width is 0 mm or more and less than 1 mm.
Y2: The swollen width is 1 mm or more and less than 2 mm.
Y3: The swollen width is 2 mm or more and less than 3 mm.
Y4: The swollen width is 3 mm or more.

The evaluation results of the chemical convertibility and the corrosion resistance after coating evaluated by the above-described methods are shown in the tables.

TABLE 2-1

| | Reference numeral | Steel sheet | Plating composition [mass %] | Spraying | Spraying speed [m/s] | Plating thickness [μm] | Average crystal grain diameter in thickness range from interface to 2/3 of thickness t [μm] |
|---|---|---|---|---|---|---|---|
| Invention Example | A1 | S1 | Al-10% Si | Yes | 67 | 10 | 6.4 |
| | A2 | S3 | Al-10% Si | Yes | 60 | 21 | 6.1 |
| | A3 | S1 | Al-10% Si | Yes | 70 | 15 | 8.5 |
| | A4 | S14 | Al 10% Si | Yes | 50 | 43 | 14.4 |
| | A5 | S8 | Al-10% Si | Yes | 31 | 60 | 15.0 |
| | A6 | S13 | Al-10% Si | Yes | 38 | 60 | 15.0 |
| | A7 | S8 | Al-10% Si | Yes | 34 | 43 | 14.7 |
| | A8 | S12 | Al-10% Si | Yes | 45 | 33 | 12.3 |
| | A9 | S11 | Al-10% Si | Yes | 31 | 33 | 11.1 |
| | A10 | S4 | Al-10% Si | Yes | 42 | 60 | 14.1 |
| | A11 | S9 | Al-10% Si | Yes | 49 | 38 | 9.3 |
| | A12 | S13 | Al-10% Si-0.1% Fe | Yes | 39 | 30 | 8.9 |
| | A13 | S9 | Al-10% Si | Yes | 51 | 32 | 7.2 |
| | A14 | S5 | Al-10% Si | Yes | 44 | 24 | 6.7 |
| | A15 | S8 | Al 10% Si | Yes | 30 | 20 | 12.0 |
| | A16 | S6 | Al-10% Si | Yes | 35 | 31 | 14.6 |
| | A17 | S14 | Al-10% Si | Yes | 40 | 40 | 15.0 |
| | A18 | S12 | Al-10% Si | Yes | 37 | 30 | 14.1 |
| | A19 | S9 | Al-10% Si | Yes | 65 | 24 | 5.5 |
| | A20 | S6 | Al-10% Si | Yes | 31 | 57 | 14.3 |
| | A21 | S11 | Al-10% Si | Yes | 34 | 60 | 12.6 |
| | A22 | S9 | Al-10% Si | Yes | 52 | 29 | 6.3 |
| | A23 | S12 | Al-10% Si | Yes | 35 | 56 | 6.4 |
| | A24 | S9 | Al-10% Si | Yes | 30 | 60 | 6.8 |
| | A25 | S13 | Al-10% Si | Yes | 70 | 10 | 3.7 |
| | A26 | S9 | Al-10% Si | Yes | 61 | 54 | 8.7 |
| | A27 | S4 | Al-10% Si | Yes | 33 | 58 | 14.1 |
| | A28 | S2 | Al-10% Si-0.1% Fe | Yes | 31 | 10 | 4.6 |
| | A29 | S15 | Al 10% Si | Yes | 34 | 32 | 8.1 |
| | A30 | S2 | Al-10% Si | Yes | 37 | 54 | 14.2 |

TABLE 2-1-continued

|  |  |  | Particles containing A group elements in surface film layer | | | | Characteristics | |
|---|---|---|---|---|---|---|---|---|
|  | Reference numeral | Element | Simple substance or compound (kind of compound in the case of compound) | Containing of oxygen atom | Content (in terms of element) [g/m²] | Average grain diameter [μm] | Chemical convertibility | Corrosion resistance after coating |
| Invention Example | A1 | Sc | Simple substance | No | 10.0 | 1.0 | X3 | Y3 |
|  | A2 | Mn | Simple substance | No | 8.0 | 0.8 | X3 | Y3 |
|  | A3 | Fe | Simple substance | No | 8.0 | 0.7 | X3 | Y3 |
|  | A4 | Co | Simple substance | No | 6.0 | 1.0 | X3 | Y3 |
|  | A5 | Nb | Simple substance | No | 1.0 | 0.5 | X3 | Y3 |
|  | A6 | Mo | Simple substance | No | 3.0 | 0.8 | X3 | Y3 |
|  | A7 | W | Simple substance | No | 2.0 | 1.0 | X3 | Y3 |
|  | A8 | Sc | Scandium chloride | No | 0.05 | 0.1 | X3 | Y3 |
|  | A9 | Mn | Manganese chloride | No | 0.5 | 0.3 | X2 | Y3 |
|  | A10 | Fe | Iron chloride | No | 0.6 | 0.4 | X2 | Y3 |
|  | A11 | Co | Cobalt chloride | No | 0.8 | 0.5 | X2 | Y3 |
|  | A12 | Ce | Cerium chloride | No | 0.4 | 0.3 | X3 | Y3 |
|  | A13 | Nb | Niobium chloride | No | 0.7 | 0.4 | X2 | Y3 |
|  | A14 | Mo | Molybdenum sulfide | No | 0.6 | 0.5 | X2 | Y3 |
|  | A15 | W | Tungsten sulfide | No | 0.4 | 0.2 | X2 | Y3 |
|  | A16 | Sc | Scandium oxide | Yes | 0.7 | 0.5 | X2 | Y3 |
|  | A17 | V | Vanadium pentoxide | Yes | 0.7 | 0.4 | X3 | Y3 |
|  | A18 | Mn | Manganese oxide | Yes | 0.6 | 0.4 | X2 | Y3 |
|  | A19 | Fe | Iron oxide | Yes | 0.6 | 0.2 | X2 | Y3 |
|  | A20 | Co | Cobalt oxide | Yes | 0.7 | 0.3 | X2 | Y3 |
|  | A21 | Ce | Cerium oxide | Yes | 0.8 | 0.3 | X3 | Y3 |
|  | A22 | Nb | Niobium oxide | Yes | 0.8 | 0.3 | X2 | Y3 |
|  | A23 | Mo | Molybdenum oxide | Yes | 0.7 | 0.2 | X2 | Y3 |
|  | A24 | W | Tungsten oxide | Yes | 0.9 | 0.5 | X2 | Y3 |
|  | A25 | V | Vanadyl acetylacetonate | Yes | 0.7 | 0.6 | X3 | Y3 |
|  | A26 | Ce | Cerium nitrate | Yes | 0.7 | 0.6 | X3 | Y3 |
|  | A27 | Nb | Potassium niobate | Yes | 0.6 | 0.4 | X2 | Y3 |
|  | A28 | Mo | Ammonium molybdate | Yes | 0.6 | 0.4 | X2 | Y3 |
|  | A29 | W | Ammonium tungstate | Yes | 0.9 | 0.6 | X2 | Y3 |
|  | A30 | Sc | Scandium oxide | Yes | 0.1 | 0.2 | X2 | Y3 |

TABLE 2-2

|  |  |  |  |  | Plating layer | | |
|---|---|---|---|---|---|---|---|
|  | Reference numeral | Steel sheet | Plating composition [mass %] | Spraying | Spraying speed [m/s] | Plating thickness [μm] | Average crystal grain diameter in thickness range from interface to 2/3 of thickness t [μm] |
| Invention Example | A31 | S9 | Al-10% Si | Yes | 53 | 60 | 15.0 |
|  | A32 | S14 | Al-20% Si | Yes | 54 | 27 | 6.1 |
|  | A33 | S10 | Al-20% Si | Yes | 70 | 10 | 6.7 |
|  | A34 | S11 | Al-10% Si-5% Fe | Yes | 54 | 15 | 8.0 |
|  | A35 | S7 | Al-20% Si | Yes | 34 | 60 | 15.0 |
|  | A36 | S15 | Al-20% Si-3% Fe | Yes | 70 | 10 | 4.3 |
|  | A37 | S10 | Al-20% Si | Yes | 66 | 30 | 6.1 |
|  | A38 | S2 | Al-20% Si | Yes | 63 | 54 | 6.8 |
|  | A39 | S10 | Al-20% Si-0.1% Fe | Yes | 36 | 60 | 14.2 |
|  | A40 | S13 | Al-20% Si | Yes | 70 | 10 | 3.4 |
|  | A41 | S2 | Al-5% Si | Yes | 31 | 60 | 6.1 |
|  | A42 | S15 | Al-5% Si | Yes | 70 | 10 | 6.3 |
|  | A43 | S5 | Al-5% Si | Yes | 40 | 27 | 4.0 |
|  | A44 | S9 | Al-5% Si | Yes | 70 | 10 | 3.2 |
|  | A45 | S7 | Al-5% Si | Yes | 34 | 28 | 5.8 |
|  | A46 | S5 | Al-5% Si | Yes | 40 | 54 | 13.5 |
|  | A47 | S15 | Al-5% Si | Yes | 33 | 60 | 14.9 |
|  | A48 | S15 | Al-10% Si | Yes | 70 | 15 | 4.3 |
|  | A49 | S5 | Al-10% Si | Yes | 41 | 32 | 8.5 |
|  | A50 | S10 | Al-5% Si | Yes | 31 | 56 | 14.3 |
|  | A51 | S9 | Al-20% Si | Yes | 33 | 41 | 11.3 |
|  | A52 | S15 | Al-10% Si-2% Fe | Yes | 38 | 36 | 10.8 |
|  | A53 | S10 | Al-10% Si | Yes | 49 | 51 | 8.5 |

TABLE 2-2-continued

|  |  |  | Particles containing A group elements in surface film layer | | | | Characteristics | |
|---|---|---|---|---|---|---|---|---|
|  | Reference numeral | Element | Simple substance or compound (kind of compound in the case of compound) | Containing of oxygen atom | Content (in terms of element) [g/m$^2$] | Average grain diameter [μm] | Chemical convertibility | Corrosion resistance after coating |
| Invention Example | A31 | V | Vanadium oxide | Yes | 0.3 | 0.3 | X3 | Y3 |
|  | A32 | Mn | Manganese oxide | Yes | 0.1 | 0.05 | X2 | Y3 |
|  | A33 | Fe | Iron oxide | Yes | 0.2 | 0.1 | X2 | Y3 |
|  | A34 | Co | Cobalt oxide | Yes | 0.1 | 0.1 | X2 | Y3 |
|  | A35 | Ce | Cerium oxide | Yes | 0.1 | 0.05 | X3 | Y3 |
|  | A36 | Nb | Niobium oxide | Yes | 0.3 | 0.2 | X2 | Y3 |
|  | A37 | Mo | Molybdenum oxide | Yes | 0.1 | 0.05 | X2 | Y3 |
|  | A38 | W | Tungsten oxide | Yes | 0.4 | 0.2 | X2 | Y3 |
|  | A39 | Sc | Scandium oxide | Yes | 0.4 | 0.2 | X2 | Y3 |
|  | A40 | V | Vanadium oxide | Yes | 0.2 | 0.05 | X3 | Y3 |
|  | A41 | Mn | Manganese oxide | Yes | 0.4 | 0.2 | X2 | Y3 |
|  | A42 | Fe | Iron oxide | Yes | 0.3 | 0.1 | X2 | Y3 |
|  | A43 | Co | Cobalt oxide | Yes | 0.2 | 0.1 | X2 | Y3 |
|  | A44 | Ce | Cerium oxide | Yes | 0.4 | 0.05 | X3 | Y3 |
|  | A45 | Nb | Niobium oxide | Yes | 0.8 | 0.3 | X2 | Y3 |
|  | A46 | Mo | Molybdenum oxide | Yes | 0.8 | 0.2 | X2 | Y3 |
|  | A47 | W | Tungsten oxide | Yes | 0.1 | 0.05 | X2 | Y3 |
|  | A48 | (1) W, (2) V | (1) Ammonium tungstate, (2) Vanadyl acetylacetonate | Yes | 0.5 | 0.2 | X3 | Y3 |
|  | A49 | (1) W, (2) Co | (1) Ammonium tungstate, (2) Cobalt nitrate | Yes | 0.5 | 0.1 | X2 | Y3 |
|  | A50 | (1) W, (2) V | (1) Ammonium tungstate, (2) Vanadyl acetylacetonate | Yes | 0.5 | 0.1 | X3 | Y3 |
|  | A51 | (1) W, (2) Co | (1) Ammonium tungstate, (2) Cobalt nitrate | Yes | 0.5 | 0.2 | X2 | Y3 |
|  | A52 | Mo | Molybdenum oxide | Yes | 0.5 | 0.3 | X2 | Y3 |
|  | A53 | W | Tungsten oxide | Yes | 0.6 | 0.4 | X2 | Y3 |

In a case where two or more kinds of particles mainly containing a simple substance and/or compound of an A group element in the surface film layer are contained, the particles are expressed as (1), (2) . . . .

TABLE 2-3

|  |  |  |  |  |  | Plating layer | | |
|---|---|---|---|---|---|---|---|---|
|  | Reference numeral | Steel sheet | Plating composition [mass %] | Spraying | Spraying speed [m/s] | Plating thickness [μm] | Average crystal grain diameter in thickness range from interface to 2/3 of thickness t [μm] |
| Comparative Example | a1 | S15 | Al-10% Si | No | — | 7 | — |
|  | a2 | S5 | Al-20% Si | Yes | 53 | 5 | 0.4 |
|  | a3 | S2 | Al-20% Si | Yes | 39 | 80 | 13.1 |
|  | a4 | S9 | Al-10% Si | No | — | 79 | 22.9 |
|  | a5 | S7 | Al-10% Si | No | — | 75 | 18.2 |
|  | a6 | S13 | Al-10% Si | Yes | 35 | 9 | 2.7 |
|  | a7 | S15 | Al-10% Si | Yes | 41 | 7 | 2.5 |
|  | a8 | S9 | Al-20% Si | Yes | 73 | 9 | 2.1 |
|  | a9 | S7 | Al-20% Si-0.3% Fe | Yes | 91 | 9 | 0.8 |
|  | a10 | S1 | Al-20% Si | Yes | 10 | 54 | 17.4 |
|  | a11 | S13 | Al-10% Si | Yes | 86 | 11 | 1.2 |
|  | a12 | S13 | Al-10% Si | Yes | 12 | 20 | 13.3 |

TABLE 2-3-continued

| | | Particles containing A group elements in surface film layer | | | | Characteristics | |
|---|---|---|---|---|---|---|---|
| | | | | | | | Corrosion |
| | | Simple substance or | | | Average | | resistance |
| | | compound (kind of | Containing | Content | grain | | after |
| | Reference | | compound | of | (in terms | diameter | Chemical | coating |
| | numeral | Element | in the case of compound) | oxygen atom | of element) [g/m²] | [μm] | convertibility | |
| Comparative Example | a1 | Al | Aluminum oxide | Yes | 0.4 | — | X4 | Y4 |
| | a2 | Al | Aluminum oxide | Yes | 0.5 | — | X4 | Y4 |
| | a3 | Al | Aluminum oxide | Yes | 0.5 | — | X4 | Y4 |
| | a4 | Mo | Ammonium molybdate | Yes | 0.005 | — | X4 | Y4 |
| | a5 | — | — | — | — | — | X4 | Y4 |
| | a6 | Ce | Cerium oxide | Yes | 10.0 | 5.0 | X4 | Y4 |
| | a7 | Cr | Chromium oxide | Yes | 8.0 | 6.0 | X4 | Y4 |
| | a8 | Fe | Iron oxide | Yes | 10.0 | 5.0 | X4 | Y4 |
| | a9 | Cr | Chromium oxide | Yes | 8.0 | 5.0 | X4 | Y4 |
| | a10 | Fe | Iron oxide | Yes | 10.0 | 7.0 | X4 | Y4 |
| | a11 | Mo | Ammonium molybdate | Yes | 0.005 | — | X4 | Y4 |
| | a12 | Mo | Ammonium molybdate | Yes | 0.005 | — | X4 | Y4 |

TABLE 3-1

| | | | Plating layer | | | | Particles containing A group elements in surface film layer | | | | |
|---|---|---|---|---|---|---|---|---|---|---|---|---|
| | Reference numeral | Steel sheet | Plating composition [mass %] | Spray-ing | Spray-ing speed [m/s] | Plating thick-ness [μm] | Average crystal grain diameter in thickness range from interface to 2/3 of thickness t [μm] | Element | Simple substance or compound (kind of compound in the case of compound) | Containing of oxygen atom | Content (in terms of element) [g/m²] | Average grain diameter [μm] |
| Invention Example | B1 | S9 | Al-10% Si | Yes | 46 | 34 | 12.3 | W | Ammonium tungstate | Yes | 0.9 | 0.4 |
| | B2 | S6 | Al-20% Si-0.1% Fe | Yes | 54 | 24 | 8.1 | W | Ammonium tungstate | Yes | 0.9 | 0.4 |
| | B3 | S14 | Al-10% Si | Yes | 43 | 33 | 9.5 | W | Ammonium tungstate | Yes | 0.9 | 0.4 |
| | B4 | S10 | Al-9% Si | Yes | 41 | 32 | 9.6 | W | Ammonium tungstate | Yes | 0.9 | 0.4 |
| | B5 | S11 | Al-10% Si | Yes | 43 | 35 | 10.3 | W | Ammonium tungstate | Yes | 0.9 | 0.4 |
| | B6 | S14 | Al-5% Si | Yes | 39 | 33 | 8.0 | W | Ammonium tungstate | Yes | 0.9 | 0.4 |
| | B7 | S7 | Al-10% Si | Yes | 34 | 46 | 14.3 | W | Ammonium tungstate | Yes | 0.9 | 0.4 |
| | B8 | S15 | Al-9.5% Si | Yes | 43 | 34 | 7.1 | V | Vanadyl acetylacetonate | Yes | 0.9 | 0.2 |
| | B9 | S10 | Al-10% Si | Yes | 37 | 40 | 11.1 | V | Vanadyl acetylacetonate | Yes | 0.9 | 0.2 |
| | B10 | S2 | Al-20% Si-10% Fe | Yes | 41 | 60 | 13.5 | V | Vanadyl acetylacetonate | Yes | 0.9 | 0.2 |
| | B11 | S2 | Al-10% Si | Yes | 34 | 60 | 15.0 | V | Vanadyl sulfate | Yes | 0.9 | 0.3 |
| | B12 | S10 | Al-20% Si | Yes | 56 | 27 | 6.8 | V | Vanadyl sulfate | Yes | 0.9 | 0.3 |
| | B13 | S13 | Al-9% Si | Yes | 44 | 43 | 13.0 | V | Vanadyl sulfate | Yes | 0.9 | 0.3 |
| | B14 | S2 | Al-10% Si | Yes | 51 | 32 | 7.3 | V | Vanadyl acetate | Yes | 0.9 | 0.3 |
| | B15 | S11 | Al-20% Si-10% Fe | Yes | 44 | 23 | 6.8 | V | Vanadyl sulfate | Yes | 0.9 | 0.3 |
| | B16 | S14 | Al-10% Si | Yes | 32 | 60 | 15.0 | V | Vanadyl sulfate | Yes | 0.9 | 0.3 |
| | B17 | S10 | Al-20% Si | Yes | 42 | 60 | 14.1 | V | Vanadyl sulfate | Yes | 0.9 | 0.3 |
| | B18 | S13 | Al-20% Si | Yes | 51 | 41 | 9.9 | V | Vanadium pentoxide | Yes | 0.9 | 0.2 |
| | B19 | S15 | Al-10% Si | Yes | 34 | 51 | 13.3 | V | Vanadium pentoxide | Yes | 0.9 | 0.2 |
| | B20 | S10 | Al-10% Si | Yes | 36 | 60 | 15.0 | V | Vanadium pentoxide | Yes | 0.9 | 0.2 |
| | B21 | S2 | Al-20% Si-0.1% Fe | Yes | 45 | 39 | 10.4 | V | Vanadium pentoxide | Yes | 0.9 | 0.2 |
| | B22 | S10 | Al-10% Si | Yes | 46 | 33 | 12.4 | Sc | Scandium oxide | Yes | 0.8 | 0.2 |
| | B23 | S13 | Al-20% Si | Yes | 31 | 34 | 11.1 | V | Vanadium pentoxide | Yes | 0.8 | 0.3 |
| | B24 | S11 | Al-10% Si | Yes | 42 | 60 | 14.1 | Mn | Manganese oxide | Yes | 0.8 | 0.3 |
| | B25 | S14 | Al-10% Si | Yes | 45 | 39 | 10.4 | Fe | Iron oxide | Yes | 0.7 | 0.3 |
| | B26 | S10 | Al-15% Si | Yes | 39 | 31 | 8.1 | Co | Cobalt oxide | Yes | 0.8 | 0.2 |
| | B27 | S2 | Al-10% Si | Yes | 35 | 43 | 14.1 | Ce | Cerium oxide | Yes | 0.9 | 0.3 |
| | B28 | S11 | Al-9% Si | Yes | 44 | 33 | 9.1 | Nb | Niobium oxide | Yes | 0.8 | 0.3 |
| | B29 | S14 | Al-5% Si | Yes | 30 | 21 | 12.4 | Mo | Molybdenum oxide | Yes | 0.8 | 0.3 |
| | B30 | S10 | Al-10% Si | Yes | 35 | 31 | 8.9 | W | Tungsten oxide | Yes | 0.7 | 0.4 |
| | B31 | S13 | Al-10% Si | Yes | 40 | 41 | 13.0 | V | Vanadyl acetylacetonate | Yes | 0.8 | 0.2 |
| | B32 | S10 | Al-20% Si-0.1% Fe | Yes | 36 | 35 | 13.6 | Ce | Cerium nitrate | Yes | 0.8 | 0.2 |

TABLE 3-1-continued

| | | Plating layer | | | | | Particles containing A group elements in surface film layer | | | | |
|---|---|---|---|---|---|---|---|---|---|---|---|
| Reference numeral | Steel sheet | Plating composition [mass %] | Spraying | Spraying speed [m/s] | Plating thickness [μm] | Average crystal grain diameter in thickness range from interface to 2/3 of thickness t [μm] | Element | Simple substance or compound (kind of compound in the case of compound) | Containing of oxygen atom | Content (in terms of element) [g/m²] | Average grain diameter [μm] |
| B33 | S13 | Al-10% Si | Yes | 64 | 25 | 5.8 | Nb | Potassium niobate | Yes | 0.8 | 0.2 |
| B34 | S2 | Al-9% Si | Yes | 31 | 56 | 14.1 | Mo | Ammonium molybdate | Yes | 0.9 | 0.3 |
| B35 | S11 | Al-5% Si | Yes | 33 | 60 | 12.1 | W | Ammonium tungstate | Yes | 0.8 | 0.3 |
| B36 | S14 | Al-9.5% Si | Yes | 56 | 28 | 6.8 | Sc | Scandium oxide | Yes | 0.8 | 0.2 |
| B37 | S10 | Al-10% Si | Yes | 30 | 21 | 12.4 | V | Vanadium pentoxide | Yes | 0.7 | 0.2 |
| B38 | S15 | Al-20% Si-0.8% Fe | Yes | 31 | 56 | 14.1 | Mn | Manganese oxide | Yes | 0.7 | 0.2 |
| B39 | S10 | Al-10% Si | Yes | 36 | 31 | 14.3 | Fe | Iron oxide | Yes | 0.8 | 0.3 |
| B40 | S2 | Al-5% Si | Yes | 67 | 24 | 5.6 | Co | Cobalt oxide | Yes | 0.8 | 0.2 |

TABLE 3-2

| | | Particles containing B group elements in surface film layer | | | Characteristics | |
|---|---|---|---|---|---|---|
| | Reference numeral | Element | Kind of compound | Content (in terms of element) [g/m²] | Chemical convertibility | Corrosion resistance after coating |
| Invention Example | B1 | Zn | Zinc oxide | 2.0 | X1 | Y2 |
| | B2 | Zn | Zinc phosphate | 1.0 | X1 | Y2 |
| | B3 | Zr | Zirconium oxide | 0.01 | X1 | Y2 |
| | B4 | Zr | Zirconium ammonium carbonate | 0.05 | X1 | Y2 |
| | B5 | Zr | Ammonium hexafluorozirconate | 0.8 | X1 | Y2 |
| | B6 | Ti | Titanium oxide | 10.0 | X1 | Y2 |
| | B7 | Ti | Fluorotitanic acid | 2.0 | X1 | Y2 |
| | B8 | Zn | Zinc oxide | 3.0 | X2 | Y2 |
| | B9 | Zn | Zinc phosphate | 2.0 | X2 | Y2 |
| | B10 | Zr | Zirconium oxide | 0.08 | X2 | Y2 |
| | B11 | Zr | Zirconium ammonium carbonate | 0.01 | X2 | Y2 |
| | B12 | Zr | Ammonium hexafluorozirconate | 3.0 | X2 | Y2 |
| | B13 | Ti | Titanium oxide | 0.3 | X2 | Y2 |
| | B14 | Ti | Fluorotitanic acid | 0.2 | X2 | Y2 |
| | B15 | Zn | Zinc oxide | 0.08 | X2 | Y2 |
| | B16 | Zn | Zinc phosphate | 0.01 | X2 | Y2 |
| | B17 | Zr | Zirconium oxide | 3.0 | X2 | Y2 |
| | B18 | Zr | Zirconium ammonium carbonate | 0.3 | X2 | Y2 |
| | B19 | Zr | Ammonium hexafluorozirconate | 0.2 | X2 | Y2 |
| | B20 | Ti | Titanium oxide | 0.01 | X2 | Y2 |
| | B21 | Ti | Fluorotitanic acid | 0.01 | X2 | Y2 |
| | B22 | Zn | Zinc oxide | 2.0 | X1 | Y2 |
| | B23 | Zn | Zinc oxide | 0.08 | X2 | Y2 |
| | B24 | Zn | Zinc oxide | 3.0 | X1 | Y2 |
| | B25 | Zn | Zinc oxide | 0.3 | X1 | Y2 |
| | B26 | Zn | Zinc oxide | 0.2 | X1 | Y2 |
| | B27 | Zn | Zinc oxide | 0.01 | X2 | Y2 |
| | B28 | Zn | Zinc oxide | 3.0 | X1 | Y2 |
| | B29 | Ti | Fluorotitanic acid | 0.3 | X1 | Y2 |
| | B30 | Zn | Zinc oxide | 0.2 | X1 | Y2 |
| | B31 | Zn | Zinc oxide | 0.01 | X2 | Y2 |
| | B32 | Ti | Fluorotitanic acid | 2.0 | X2 | Y2 |
| | B33 | Ti | Fluorotitanic acid | 0.08 | X1 | Y2 |
| | B34 | Zn | Zinc oxide | 0.01 | X1 | Y2 |
| | B35 | Zn | Zinc oxide | 3.0 | X1 | Y2 |
| | B36 | Zn | Zinc oxide | 0.3 | X1 | Y2 |
| | B37 | Zr | Zirconium ammonium carbonate | 0.2 | X2 | Y2 |
| | B38 | Zr | Zirconium ammonium carbonate | 0.01 | X1 | Y2 |
| | B39 | Zr | Zirconium ammonium carbonate | 3.0 | X1 | Y2 |
| | B40 | Zr | Zirconium ammonium carbonate | 0.3 | X1 | Y2 |

TABLE 3-3

| | | | Plating layer | | | | | | | | |
|---|---|---|---|---|---|---|---|---|---|---|---|
| | | | | | | Average crystal grain diameter in thickness range from interface to 2/3 of thickness t [µm] | | Particles containing A group elements in surface film layer | | | |
| | Reference numeral | Steel sheet | Plating composition [mass %] | Spray-ing | Spray-ing speed [m/s] | Plating thickness [µm] | | Element | Simple substance or compound (kind of compound in the case of compound) | Contain-ing of oxygen atom | Content (in terms of element) [g/m$^2$] | Average grain diameter [µm] |
| Invention Example | B41 | S13 | Al-10% Si | Yes | 40 | 41 | 15.0 | Ce | Cerium oxide | Yes | 0.7 | 0.3 |
| | B42 | S2 | Al-10% Si | Yes | 30 | 21 | 12.4 | Nb | Niobium oxide | Yes | 0.8 | 0.3 |
| | B43 | S11 | Al-5% Si | Yes | 35 | 31 | 14.6 | Mo | Molybdenum oxide | Yes | 0.7 | 0.3 |
| | B44 | S13 | Al-10% Si | Yes | 31 | 56 | 14.1 | W | Tungsten oxide | Yes | 0.8 | 0.4 |
| | B45 | S2 | Al-10% Si | Yes | 39 | 33 | 8.0 | Sc | Scandium oxide | Yes | 0.8 | 0.2 |
| | B46 | S11 | Al-9% Si | Yes | 34 | 44 | 11.5 | V | Vanadium oxide | Yes | 0.7 | 0.2 |
| | B47 | S10 | Al-9.5% Si | Yes | 43 | 35 | 7.3 | Mn | Manganese oxide | Yes | 0.7 | 0.2 |
| | B48 | S13 | Al-10% Si | Yes | 30 | 21 | 8.7 | Fe | Iron oxide | Yes | 0.8 | 0.3 |
| | B49 | S15 | Al-20% Si-10% Fe | Yes | 68 | 25 | 5.8 | Co | Cobalt oxide | Yes | 0.8 | 0.2 |
| | B50 | S2 | Al-10% Si | Yes | 33 | 57 | 14.3 | Ce | Cerium oxide | Yes | 0.7 | 0.3 |
| | B51 | S10 | Al-10% Si | Yes | 35 | 60 | 12.8 | Nb | Niobium oxide | Yes | 0.5 | 0.3 |
| | B52 | S13 | Al-20% Si-0.1% Fe | Yes | 49 | 38 | 8.4 | Mo | Molybdenum oxide | Yes | 0.4 | 0.3 |
| | B53 | S2 | Al-10% Si | Yes | 30 | 21 | 12.4 | W | Tungsten oxide | Yes | 0.8 | 0.4 |
| | B54 | S11 | Al-9.5% Si | Yes | 43 | 34 | 9.0 | Sc | Scandium oxide | Yes | 0.8 | 0.2 |
| | B55 | S14 | Al-9% Si | Yes | 37 | 41 | 13.6 | V | Vanadium pentoxide | Yes | 0.9 | 0.2 |
| | B56 | S13 | Al-20% Si-0.5% Fe | Yes | 43 | 36 | 10.2 | Mn | Manganese oxide | Yes | 0.7 | 0.2 |
| | B57 | S15 | Al-10% Si | Yes | 41 | 31 | 12.1 | Fe | Iron oxide | Yes | 0.8 | 0.3 |
| | B58 | S10 | Al-9% Si | Yes | 33 | 57 | 14.2 | Co | Cobalt oxide | Yes | 0.7 | 0.2 |
| | B59 | S14 | Al-20% Si-0.8% Fe | Yes | 32 | 60 | 12.4 | Ce | Cerium oxide | Yes | 0.8 | 0.3 |
| | B60 | S10 | Al-5% Si | Yes | 54 | 27 | 6.9 | Nb | Niobium oxide | Yes | 0.9 | 0.3 |
| | B61 | S13 | Al-10% Si | Yes | 30 | 21 | 11.3 | Mo | Molybdenum oxide | Yes | 0.7 | 0.3 |
| | B62 | S15 | Al-9.5% Si | Yes | 31 | 57 | 13.1 | W | Tungsten oxide | Yes | 0.5 | 0.4 |
| | B63 | S10 | Al-10% Si | Yes | 37 | 32 | 14.4 | V | Vanadyl acetylacetonate | Yes | 0.4 | 0.2 |
| | B64 | S10 | Al-10% Si | Yes | 54 | 27 | 6.4 | Nb | Cerium nitrate | Yes | 0.8 | 0.2 |
| | B65 | S13 | Al-20% Si-0.1% Fe | Yes | 42 | 60 | 14.1 | Nb | Potassium niobate | Yes | 0.9 | 0.2 |
| | B66 | S2 | Al-10% Si | Yes | 51 | 41 | 9.9 | Mo | Ammonium molybdate | Yes | 0.8 | 0.3 |

TABLE 3-4

| | | Particles containing B group elements in surface film layer | | | Characteristics | |
|---|---|---|---|---|---|---|
| | Reference numeral | Element | Kind of compound | Content (in terms of element) [g/m$^2$] | Chemical convertibility | Corrosion resistance after coating |
| Invention Example | B41 | (1)Zn, (2)Zr | (1) Zinc oxide, (2) Zirconium ammonium carbonate | 0.01 | X2 | Y2 |
| | B42 | (1)Zn, (2)Zr | (1) Zinc oxide, (2) Zirconium ammonium carbonate | 0.01 | X1 | Y2 |
| | B43 | (1)Zn, (2)Zr | (1) Zinc oxide, (2) Zirconium ammonium carbonate | 0.05 | X1 | Y2 |
| | B44 | (1)Zn, (2)Zr | (1) Zinc oxide, (2) Zirconium ammonium carbonate | 0.8 | X1 | Y2 |
| | B45 | (1)Zn, (2)Zr | (1) Zinc oxide, (2) Zirconium ammonium carbonate | 10.0 | X1 | Y2 |
| | B46 | (1)Zn, (2)Zr | (1) Zinc oxide, (2) Zirconium ammonium carbonate | 2.0 | X2 | Y2 |
| | B47 | (1)Zn, (2)Zr | (1) Zinc oxide, (2) Zirconium ammonium carbonate | 0.8 | X1 | Y2 |
| | B48 | (1)Zn, (2)Zr | (1) Zinc oxide, (2) Zirconium ammonium carbonate | 0.7 | X1 | Y2 |
| | B49 | (1)Zn, (2)Zr | (1) Zinc oxide, (2) Zirconium ammonium carbonate | 0.8 | X1 | Y2 |
| | B50 | (1)Zn, (2)Zr | (1) Zinc oxide, (2) Zirconium ammonium carbonate | 0.8 | X2 | Y2 |

TABLE 3-4-continued

Particles containing B group elements in surface film layer

| Reference numeral | Element | Kind of compound | Content (in terms of element) [g/m²] | Characteristics Chemical convertibility | Corrosion resistance after coating |
|---|---|---|---|---|---|
| B51 | (1)Zr, (2)Ti | (1) Zirconium ammonium carbonate, (2) Titanium oxide | 0.4 | X1 | Y2 |
| B52 | (1)Zr, (2)Ti | (1) Zirconium ammonium carbonate, (2) Titanium oxide | 0.8 | X1 | Y2 |
| B53 | (1)Zr, (2)Ti | (1) Zirconium ammonium carbonate, (2) Titanium oxide | 0.01 | X1 | Y2 |
| B54 | (1)Zr, (2)Ti | (1) Zirconium ammonium carbonate, (2) Titanium oxide | 0.01 | X1 | Y2 |
| B55 | (1)Zr, (2)Ti | (1) Zirconium ammonium carbonate, (2) Titanium oxide | 0.05 | X2 | Y2 |
| B56 | (1)Zr, (2)Ti | (1) Zirconium ammonium carbonate, (2) Titanium oxide | 10.0 | X1 | Y2 |
| B57 | (1)Zr, (2)Ti | (1) Zirconium ammonium carbonate, (2) Titanium oxide | 0.8 | X1 | Y2 |
| B58 | (1)Zr, (2)Ti | (1) Zirconium ammonium carbonate, (2) Titanium oxide | 0.4 | X1 | Y2 |
| B59 | (1)Zr, (2)Ti | (1) Zirconium ammonium carbonate, (2) Titanium oxide | 0.4 | X2 | Y2 |
| B60 | (1)Zr, (2)Ti | (1) Zirconium ammonium carbonate, (2) Titanium oxide | 0.8 | X1 | Y2 |
| B61 | (1)Zr, (2)Ti | (1) Zirconium ammonium carbonate, (2) Titanium oxide | 0.05 | X1 | Y2 |
| B62 | (1)Zr, (2)Ti | (1) Zirconium ammonium carbonate, (2) Titanium oxide | 0.8 | X1 | Y2 |
| B63 | (1)Zr, (2)Ti | (1) Zirconium ammonium carbonate, (2) Titanium oxide | 10.0 | X2 | Y2 |
| B64 | (1)Zr, (2)Ti | (1) Zirconium ammonium carbonate, (2) Titanium oxide | 0.8 | X2 | Y2 |
| B65 | (1)Zr, (2)Ti | (1) Zirconium ammonium carbonate, (2) Titanium oxide | 0.8 | X1 | Y2 |
| B66 | (1)Zr, (2)Ti | (1) Zirconium ammonium carbonate, (2) Titanium oxide | 0.8 | X1 | Y2 |

In a case where two or more kinds of particles mainly containing a compound of a B group element in the surface film layer are contained, the particles are expressed as (1), (2) . . . .

TABLE 3-5

| | Reference numeral | Steel sheet | Plating composition [mass %] | Spraying | Spraying speed [m/s] | Plating thickness [μm] | Average crystal grain diameter in thickness range from interface to 2/3 of thickness t [μm] | Element | Simple substance or compound (kind of compound in the case of compound) | Containing of oxygen atom | Content (in terms of element) [g/m²] | Average grain diameter [μm] |
|---|---|---|---|---|---|---|---|---|---|---|---|---|
| Invention Example | B67 | S11 | Al-20% Si-10% Fe | Yes | 34 | 51 | 13.3 | W | Ammonium tungstate | Yes | 0.8 | 0.3 |
| | B68 | S14 | Al-10% Si | Yes | 39 | 60 | 15.0 | Sc | Scandium oxide | Yes | 0.9 | 0.2 |
| | B69 | S10 | Al-10% Si | Yes | 45 | 39 | 10.4 | V | Vanadium oxide | Yes | 0.7 | 0.2 |
| | B70 | S13 | Al-5% Si | Yes | 48 | 33 | 12.4 | Mn | Manganese oxide | Yes | 0.4 | 0.2 |
| | B71 | S15 | Al-10% Si | Yes | 31 | 34 | 11.1 | Fe | Iron oxide | Yes | 0.8 | 0.3 |
| | B72 | S10 | Al-20% Si-0.1% Fe | Yes | 42 | 60 | 14.1 | Co | Cobalt oxide | Yes | 0.8 | 0.2 |
| | B73 | S10 | Al-10% Si | Yes | 33 | 60 | 12.1 | Ce | Cerium oxide | Yes | 0.7 | 0.3 |
| | B74 | S13 | Al-20% Si-10% Fe | Yes | 57 | 29 | 6.9 | Nb | Niobium oxide | Yes | 0.5 | 0.3 |
| | B75 | S15 | Al-10% Si | Yes | 30 | 22 | 12.5 | Mo | Molybdenum oxide | Yes | 0.4 | 0.3 |
| | B76 | S10 | Al-10% Si | Yes | 32 | 54 | 14.2 | W | Tungsten oxide | Yes | 0.8 | 0.4 |
| | B77 | S2 | Al-5% Si | Yes | 34 | 42 | 14.1 | Sc | Scandium oxide | Yes | 0.8 | 0.2 |
| | B78 | S10 | Al-10% Si | Yes | 41 | 60 | 14.2 | V | Vanadium oxide | Yes | 0.9 | 0.2 |
| | B79 | S14 | Al-20% Si-0.1% Fe | Yes | 44 | 38 | 10.5 | Mn | Manganese oxide | Yes | 0.8 | 0.2 |

TABLE 3-5-continued

| | | | | | | Plating layer | | | | | |
| | | | | | | | | Particles containing A group elements in surface film layer | | | |
| Reference numeral | Steel sheet | Plating composition [mass %] | Spraying | Spraying speed [m/s] | Plating thickness [μm] | Average crystal grain diameter in thickness range from interface to 2/3 of thickness t [μm] | Element | Simple substance or compound (kind of compound in the case of compound) | Containing of oxygen atom | Content (in terms of element) [g/m²] | Average grain diameter [μm] |
|---|---|---|---|---|---|---|---|---|---|---|---|
| B80 | S10 | Al-10% Si | Yes | 38 | 32 | 8.2 | Fe | Iron oxide | Yes | 0.8 | 0.2 |
| B81 | S13 | Al-10% Si | Yes | 41 | 60 | 14.2 | Co | Cobalt oxide | Yes | 0.4 | 0.3 |
| B82 | S10 | Al-5% Si | Yes | 38 | 48 | 14.2 | Ce | Cerium oxide | Yes | 0.8 | 0.3 |
| B83 | S2 | Al-15% Si | Yes | 45 | 39 | 10.4 | Nb | Niobium oxide | Yes | 0.9 | 0.2 |
| B84 | S14 | Al-10% Si | Yes | 39 | 31 | 8.1 | Mo | Molybdenum oxide | Yes | 0.8 | 0.4 |
| B85 | S10 | Al-10% Si | Yes | 35 | 43 | 14.1 | W | Tungsten oxide | Yes | 0.9 | 0.2 |

TABLE 3-6

| | | Particles containing B group elements in surface film layer | | | Characteristics | |
| | Reference numeral | Element | Kind of compound | Content (in terms of element) [g/m²] | Chemical convertibility | Corrosion resistance after coating |
|---|---|---|---|---|---|---|
| Invention Example | B67 | (1) Zr, (2) Ti | (1) Zirconium ammonium carbonate, (2) Titanium oxide | 10.0 | X1 | Y2 |
| | B68 | (1) Zr, (2) Ti | (1) Zirconium ammonium carbonate, (2) Titanium oxide | 0.8 | X1 | Y2 |
| | B69 | (1) Zr, (2) Ti | (1) Zirconium ammonium carbonate, (2) Titanium oxide | 0.5 | X2 | Y2 |
| | B70 | (1) Zn, (2) Zr, (3) Ti | (1) Zinc oxide, (2) Zirconium ammonium carbonate, (3) Titanium oxide | 0.4 | X1 | Y2 |
| | B71 | (1) Zn, (2) Zr, (3) Ti | (1) Zinc oxide, (2) Zirconium ammonium carbonate, (3) Titanium oxide | 0.8 | X1 | Y2 |
| | B72 | (1) Zn, (2) Zr, (3) Ti | (1) Zinc oxide, (2) Zirconium ammonium carbonate, (3) Titanium oxide | 0.01 | X1 | Y2 |
| | B73 | (1) Zn, (2) Zr, (3) Ti | (1) Zinc oxide, (2) Zirconium ammonium carbonate, (3) Titanium oxide | 0.05 | X2 | Y2 |
| | B74 | (1) Zn, (2) Zr, (3) Ti | (1) Zinc oxide, (2) Zirconium ammonium carbonate, (3) Titanium oxide | 0.8 | X1 | Y2 |
| | B75 | (1) Zn, (2) Zr, (3) Ti | (1) Zinc oxide, (2) Zirconium ammonium carbonate, (3) Titanium oxide | 0.01 | X1 | Y2 |
| | B76 | (1) Zn, (2) Zr, (3) Ti | (1) Zinc oxide, (2) Zirconium ammonium carbonate, (3) Titanium oxide | 0.5 | X1 | Y2 |
| | B77 | (1) Zn, (2) Zr, (3) Ti | (1) Zinc oxide, (2) Zirconium ammonium carbonate, (3) Titanium oxide | 0.8 | X1 | Y2 |
| | B78 | (1) Zn, (2) Zr, (3) Ti | (1) Zinc oxide, (2) Zirconium ammonium carbonate, (3) Titanium oxide | 0.4 | X2 | Y2 |
| | B79 | (1) Zn, (2) Zr, (3) Ti | (1) Zinc oxide, (2) Zirconium ammonium carbonate, (3) Titanium oxide | 0.01 | X1 | Y2 |

TABLE 3-6-continued

| | Particles containing B group elements in surface film layer | | | Characteristics | |
|---|---|---|---|---|---|
| Reference numeral | Element | Kind of compound | Content (in terms of element) [g/m$^2$] | Chemical convertibility | Corrosion resistance after coating |
| B80 | (1) Zn, (2) Zr, (3) Ti | (1) Zinc oxide, (2) Zirconium ammonium carbonate, (3) Titanium oxide | 0.01 | X1 | Y2 |
| B81 | (1) Zn, (2) Zr, (3) Ti | (1) Zinc oxide, (2) Zirconium ammonium carbonate, (3) Titanium oxide | 0.05 | X1 | Y2 |
| B82 | (1) Zn, (2) Zr, (3) Ti | (1) Zinc oxide, (2) Zirconium ammonium carbonate, (3) Titanium oxide | 0.8 | X2 | Y2 |
| B83 | (1) Zn, (2) Zr, (3) Ti | (1) Zinc oxide, (2) Zirconium ammonium carbonate, (3) Titanium oxide | 0.8 | X1 | Y2 |
| B84 | (1) Zn, (2) Zr, (3) Ti | (1) Zinc oxide, (2) Zirconium ammonium carbonate, (3) Titanium oxide | 0.5 | X1 | Y2 |
| B85 | (1) Zn, (2) Zr, (3) Ti | (1) Zinc oxide, (2) Zirconium ammonium carbonate, (3) Titanium oxide | 0.8 | X1 | Y2 |

In a case where two or more kinds of particles mainly containing a compound of a B group element in the surface film layer are contained, the particles are expressed as (1), (2) . . . .

TABLE 3-7

| | | | Plating layer | | | | Particles containing A group elements in surface film layer | | | |
|---|---|---|---|---|---|---|---|---|---|---|---|
| | Reference numeral | Steel sheet | Plating composition [mass %] | Spraying | Spraying speed [m/s] | Plating thickness [μm] | Average crystal grain diameter in thickness range from interface to 2/3 of thickness t [μm] | Element | Simple substance or compound (kind of compound in the case of compound) | Containing of oxygen atom | Content (in terms of element) [g/m$^2$] | Average grain diameter [μm] |
| Invention Example | B86 | S2 | Al-10% Si | Yes | 44 | 33 | 9.1 | Sc | Simple substance | No | 2.2 | 0.4 |
| | B87 | S11 | Al-5% Si | Yes | 30 | 21 | 12.4 | V | Simple substance | No | 2.4 | 0.3 |
| | B88 | S2 | Al-10% Si | Yes | 35 | 31 | 8.9 | Mn | Simple substance | No | 2.4 | 0.3 |
| | B89 | S14 | Al 20% Si-0.1% Fe | Yes | 44 | 38 | 10.5 | Fe | Simple substance | No | 2.3 | 0.4 |
| | B90 | S10 | Al-10% Si | Yes | 34 | 31 | 9.2 | Co | Simple substance | No | 3.1 | 0.4 |
| | B91 | S2 | Al-5% Si | Yes | 30 | 21 | 12.4 | Ce | Simple substance | No | 2.1 | 0.4 |
| | B92 | S11 | Al-10% Si | Yes | 35 | 31 | 8.9 | Nb | Simple substance | No | 1.1 | 0.3 |
| | B93 | S14 | Al-10% Si | Yes | 40 | 41 | 13.0 | Mo | Simple substance | No | 2.1 | 0.4 |
| | B94 | S10 | Al-20% Si-0.5% Fe | Yes | 38 | 32 | 8.4 | W | Simple substance | No | 2.7 | 0.5 |
| | B95 | S2 | Al-10% Si | Yes | 51 | 32 | 7.3 | Sc | Simple substance | No | 2.6 | 0.4 |
| | B96 | S11 | Al-15% Si | Yes | 46 | 23 | 7.4 | V | Simple substance | No | 2.6 | 0.3 |
| | B97 | S2 | Al-10% Si | Yes | 43 | 38 | 10.5 | Mn | Simple substance | No | 2.1 | 0.4 |
| | B98 | S14 | Al-20% Si-0.1% Fe | Yes | 42 | 60 | 14.1 | Fe | Simple substance | No | 2.1 | 0.3 |
| | B99 | S10 | Al-10% Si | Yes | 51 | 41 | 9.9 | Co | Simple substance | No | 3.1 | 0.5 |
| | B100 | S2 | A-20% Si-0.5% Fe | Yes | 34 | 51 | 13.3 | Ce | Simple substance | No | 1.6 | 0.3 |
| | B101 | S10 | Al-15% Si | Yes | 38 | 32 | 8.2 | Nb | Simple substance | No | 1.7 | 0.3 |
| | B102 | S2 | Al-20% Si-0.5% Fe | Yes | 45 | 39 | 9.4 | Mo | Simple substance | No | 2.1 | 0.4 |
| | B103 | S11 | Al-10% Si | Yes | 46 | 33 | 11.4 | W | Simple substance | No | 2.5 | 0.5 |
| | B104 | S13 | Al-5% Si | Yes | 31 | 34 | 11.1 | Sc | Simple substance | No | 2.6 | 0.4 |
| | B105 | S2 | Al-10% Si | Yes | 36 | 60 | 14.2 | V | Simple substance | No | 2.6 | 0.4 |
| | B106 | S10 | Al-5% Si | Yes | 32 | 60 | 13.5 | Mn | Simple substance | No | 2.1 | 0.3 |
| | B107 | S13 | Al-20% Si-0.1% Fe | Yes | 34 | 42 | 14.5 | Fe | Simple substance | No | 2.1 | 0.4 |

TABLE 3-7-continued

|  |  |  |  |  |  | Plating layer | | | | | |
|---|---|---|---|---|---|---|---|---|---|---|---|
|  |  |  |  |  |  | Average crystal grain diameter in thickness range from interface to 2/3 of thickness t [μm] | Particles containing A group elements in surface film layer | | | | |
| Reference numeral | Steel sheet | Plating composition [mass %] | Spraying | Spraying speed [m/s] | Plating thickness [μm] |  | Element | Simple substance or compound (kind of compound in the case of compound) | Containing of oxygen atom | Content (in terms of element) [g/m²] | Average grain diameter [μm] |
| B108 | S2 | Al-10% Si | Yes | 35 | 60 | 13.1 | Co | Simple substance | No | 3.1 | 0.5 |
| B109 | S2 | Al-20% Si-0.1% Fe | Yes | 41 | 38 | 9.2 | Ce | Simple substance | No | 1.6 | 0.3 |
| B110 | S11 | Al-10% Si | Yes | 46 | 33 | 8.2 | Nb | Simple substance | No | 1.7 | 0.3 |
| B111 | S2 | Al-5% Si | Yes | 36 | 60 | 14.3 | Mo | Simple substance | No | 2.1 | 0.3 |
| B112 | S11 | Al-10% Si | Yes | 31 | 55 | 14.4 | W | Simple substance | No | 2.5 | 0.4 |

TABLE 3-8

|  |  | Particles containing B group elements in surface film layer | | | Characteristics | |
|---|---|---|---|---|---|---|
|  | Reference numeral | Element | Kind of compound | Content (in terms of element) [g/m²] | Chemical convertibility | Corrosion resistance after coating |
| Invention Example | B86 | Zn | Zinc oxide | 2.0 | X1 | Y2 |
|  | B87 | Zn | Zinc oxide | 0.08 | X2 | Y2 |
|  | B88 | Zn | Zinc oxide | 3.0 | X1 | Y2 |
|  | B89 | Zn | Zinc oxide | 0.3 | X1 | Y2 |
|  | B90 | Zn | Zinc oxide | 0.2 | X1 | Y2 |
|  | B91 | Zn | Zinc oxide | 0.01 | X2 | Y2 |
|  | B92 | Zn | Zinc oxide | 3.0 | X1 | Y2 |
|  | B93 | Ti | Fluorotitanic acid | 0.3 | X1 | Y2 |
|  | B94 | Zr | Zirconium ammonium carbonate | 0.2 | X1 | Y2 |
|  | B95 | (1) Zn, (2) Zr | (1) Zinc oxide, (2) Zirconium ammonium carbonate | 0.5 | X1 | Y2 |
|  | B96 | (1) Zn, (2) Zr | (1) Zinc oxide, (2) Zirconium ammonium carbonate | 0.6 | X2 | Y2 |
|  | B97 | (1) Zn, (2) Zr | (1) Zinc oxide, (2) Zirconium ammonium carbonate | 1.9 | X1 | Y2 |
|  | B98 | (1) Zn, (2) Zr | (1) Zinc oxide, (2) Zirconium ammonium carbonate | 1.9 | X1 | Y2 |
|  | B99 | (1) Zr, (2) Ti | (1) Zirconium ammonium carbonate, (2) Titanium oxide | 1.9 | X1 | Y2 |
|  | B100 | (1) Zr, (2) Ti | (1) Zirconium ammonium carbonate, (2) Titanium oxide | 1.9 | X2 | Y2 |
|  | B101 | (1) Zr, (2) Ti | (1) Zirconium ammonium carbonate, (2) Titanium oxide | 1.3 | X1 | Y2 |
|  | B102 | (1) Zr, (2) Ti | (1) Zirconium ammonium carbonate, (2) Titanium oxide | 1.9 | X1 | Y2 |
|  | B103 | (1) Zr, (2) Ti | (1) Zirconium ammonium carbonate, (2) Titanium oxide | 1.9 | X1 | Y2 |
|  | B104 | (1) Zr, (2) Ti | (1) Zirconium ammonium carbonate, (2) Titanium oxide | 1.3 | X1 | Y2 |
|  | B105 | (1) Zn, (2) Zr, (3) Ti | (1) Zinc oxide, (2) Zirconium ammonium carbonate, (3) Titanium oxide | 1.4 | X2 | Y2 |
|  | B106 | (1) Zn, (2) Zr, (3) Ti | (1) Zinc oxide, (2) Zirconium ammonium carbonate, (3) Titanium oxide | 1.4 | X1 | Y2 |
|  | B107 | (1) Zn, (2) Zr, (3) Ti | (1) Zinc oxide, (2) Zirconium ammonium carbonate, (3) Titanium oxide | 2.0 | X1 | Y2 |
|  | B108 | (1) Zn, (2) Zr, (3) Ti | (1) Zinc oxide, (2) Zirconium ammonium carbonate, (3) Titanium oxide | 1.4 | X1 | Y2 |
|  | B109 | (1) Zn, (2) Zr, (3) Ti | (1) Zinc oxide, (2) Zirconium ammonium carbonate, (3) Titanium oxide | 1.4 | X2 | Y3 |
|  | B110 | (1) Zn, (2) Zr, (3) Ti | (1) Zinc oxide, (2) Zirconium ammonium carbonate, (3) Titanium oxide | 1.4 | X1 | Y2 |

TABLE 3-8-continued

| | Particles containing B group elements in surface film layer | | | Characteristics | |
|---|---|---|---|---|---|
| Reference numeral | Element | Kind of compound | Content (in terms of element) [g/m$^2$] | Chemical convertibility | Corrosion resistance after coating |
| B111 | (1) Zn, (2) Zr, (3) Ti | (1) Zinc oxide, (2) Zirconium ammonium carbonate, (3) Titanium oxide | 0.7 | X1 | Y2 |
| B112 | (1) Zn, (2) Zr, (3) Ti | (1) Zinc oxide, (2) Zirconium ammonium carbonate, (3) Titanium oxide | 0.6 | X1 | Y2 |

In a case where two or more kinds of particles mainly containing a compound of a B group element in the surface film layer are contained, the particles are expressed as (1), (2) . . . .

TABLE 4

| | | | | | | Plating layer | | |
|---|---|---|---|---|---|---|---|---|
| | Reference numeral | Steel sheet | Plating composition [mass %] | Spraying | Spraying speed [m/s] | Plating thickness [μm] | Average grain crystal diameter in thickness range from interface to 2/3 of thickness t [μm] | |
| Invention Example | C1 | S6 | Al-10% Si-0.1% Ca | Yes | 41 | 39 | 7.5 | |
| | C2 | S14 | Al-10% Si-0.1% Mg | Yes | 31 | 23 | 8.7 | |
| | C3 | S10 | Al-10% Si-0.1% Sr | Yes | 64 | 21 | 5.9 | |
| | C4 | S11 | Al-10% Si-0.1% Ti | Yes | 34 | 58 | 14.1 | |
| | C5 | S14 | Al-10% Si-1% Ca | Yes | 35 | 60 | 15.0 | |
| | C6 | S7 | Al-10% Si-1% Mg | Yes | 51 | 41 | 9.9 | |
| | C7 | S15 | Al-10% Si-3% Sr | Yes | 42 | 60 | 14.1 | |
| | C8 | S10 | Al-10% Si-3% Ti | Yes | 56 | 27 | 6.8 | |
| | C9 | S2 | Al-10% Si-0.15% Mg | Yes | 32 | 60 | 15.0 | |
| | C10 | S2 | Al-10% Si-0.35% Mg | Yes | 32 | 60 | 15.0 | |
| | C11 | S10 | Al-10% Si-0.09% Mg | Yes | 44 | 23 | 6.8 | |
| | C12 | S13 | Al-10% Si-0.1% Sr | Yes | 32 | 60 | 15.0 | |
| | C13 | S2 | Al-10% Si-0.1% Ti | Yes | 42 | 60 | 14.1 | |
| | C14 | S11 | Al-10% Si-0.08% Mg | Yes | 51 | 41 | 9.9 | |
| | C15 | S15 | Al-10% Si-0.1% Mg | Yes | 38 | 32 | 8.2 | |
| | C16 | S10 | Al-10% Si-0.1% Sr | Yes | 34 | 42 | 14.1 | |
| | C17 | S2 | Al-10% Si-0.1% Ti | Yes | 41 | 60 | 14.2 | |
| | C18 | S15 | Al-10% Si-0.05% Mg | Yes | 44 | 38 | 9.5 | |
| | C19 | S10 | Al-10% Si-0.15% Mg | Yes | 34 | 42 | 14.1 | |
| | C20 | S2 | Al-10% Si-0.1% Sr | Yes | 42 | 31 | 7.2 | |
| | C21 | S2 | Al-10% Si-0.1% Ti | Yes | 36 | 33 | 9.9 | |
| | C22 | S10 | Al-10% Si-1% Ca | Yes | 40 | 32 | 7.9 | |
| | C23 | S13 | Al-10% Si-1% Mg | Yes | 31 | 58 | 14.1 | |
| | C24 | S2 | Al-10% Si-0.35% Mg | Yes | 34 | 14 | 11.5 | |

| | | Particles containing A group elements in surface film layer | | | | | Characteristics | |
|---|---|---|---|---|---|---|---|---|
| | Reference numeral | Element | Kind of compound | Containing of oxygen atom | Content (in terms of element) [g/m$^2$] | Average grain diameter [μm] | Chemical convertibility | Corrosion resistance after coating |
| Invention Example | C1 | W | Ammonium tungstate | Yes | 0.9 | 0.4 | X1 | Y1 |
| | C2 | W | Ammonium tungstate | Yes | 0.9 | 0.4 | X1 | Y1 |
| | C3 | W | Ammonium tungstate | Yes | 0.9 | 0.4 | X1 | Y1 |
| | C4 | W | Ammonium tungstate | Yes | 0.9 | 0.4 | X1 | Y1 |
| | C5 | W | Ammonium tungstate | Yes | 0.9 | 0.4 | X1 | Y1 |
| | C6 | W | Ammonium tungstate | Yes | 0.9 | 0.4 | X1 | Y1 |
| | C7 | W | Ammonium tungstate | Yes | 0.7 | 0.4 | X1 | Y1 |
| | C8 | W | Ammonium tungstate | Yes | 0.7 | 0.4 | X1 | Y1 |
| | C9 | W | Ammonium tungstate | Yes | 0.7 | 0.4 | X1 | Y1 |
| | C10 | W | Ammonium tungstate | Yes | 0.7 | 0.4 | X1 | Y1 |
| | C11 | W | Ammonium tungstate | Yes | 0.7 | 0.4 | X1 | Y1 |
| | C12 | W | Ammonium tungstate | Yes | 0.7 | 0.4 | X1 | Y1 |
| | C13 | W | Ammonium tungstate | Yes | 0.7 | 0.4 | X1 | Y1 |
| | C14 | W | Ammonium tungstate | Yes | 0.7 | 0.4 | X1 | Y1 |
| | C15 | V | Vanadyl acetylacetonate | Yes | 0.2 | 0.2 | X2 | Y1 |
| | C16 | V | Vanadyl acetylacetonate | Yes | 0.2 | 0.2 | X2 | Y1 |

TABLE 4-continued

| | | | | | | | |
|---|---|---|---|---|---|---|---|
| C17 | V | Vanadyl acetylacetonate | Yes | 0.2 | 0.2 | X2 | Y1 |
| C18 | V | Vanadyl acetylacetonate | Yes | 0.2 | 0.2 | X2 | Y1 |
| C19 | V | Vanadyl sulfate | Yes | 0.2 | 0.3 | X2 | Y1 |
| C20 | V | Vanadyl sulfate | Yes | 0.2 | 0.3 | X2 | Y1 |
| C21 | V | Vanadyl sulfate | Yes | 0.2 | 0.3 | X2 | Y1 |
| C22 | V | Vanadyl sulfate | Yes | 0.2 | 0.3 | X2 | Y1 |
| C23 | V | Vanadyl sulfate | Yes | 0.2 | 0.3 | X2 | Y1 |
| C24 | V | Vanadyl sulfate | Yes | 0.2 | 0.3 | X2 | Y1 |

As shown in Tables 2-1 and 2-2, Invention Examples A1 to A53 in which the average grain diameter of the particles mainly containing the simple substance and/or compound of the A group element in the surface film layer and the content of the A group element were within the scope of the present invention had excellent chemical convertibility and corrosion resistance after coating.

On the other hand, Comparative Examples a1 to a12 in Table 2-3 were all poor in the chemical convertibility and the corrosion resistance after coating. For the reference numeral a1, "—" in the column of the average crystal grain diameter of the plating layer in a thickness range from the interface between the plating layer and the surface film layer to the ⅔ portion of the thickness t means that the average crystal grain diameter became larger than 2t/3.

In all of Comparative Examples a1 to a3, since the surface film layers were formed of a compound of Al which did not belong to the A group elements, the chemical convertibility and the corrosion resistance after coating were poor.

In Comparative Examples a4, a11, and a12, since the surface film layers were formed of a compound of Mo which belonged to the A group elements, but the total contents of Mo were too small, the chemical convertibility and the corrosion resistance after coating were poor.

In Comparative Example a5, since the surface film layer contained no A group elements, the chemical convertibility and the corrosion resistance after coating were poor.

In Comparative Examples a7 and a9, since the surface film layers were formed of a compound of Cr which did not belong to the A group elements, the chemical convertibility and the corrosion resistance after coating were poor.

In Comparative Examples a6 and a9, since the thicknesses of the plating layers became small, the chemical convertibility and the corrosion resistance after coating were poor.

In Comparative Example a10, since the average crystal grain diameter in the plating layer was large, the chemical convertibility and the corrosion resistance after coating were poor.

As shown in Tables 3-1 to 3-8, in cases where the surface film layer contained the particles mainly containing the simple substance and/or compound of the A group element and the particles mainly containing the compound of the B group element, regarding the chemical convertibility and the corrosion resistance after coating, the same or superior results were shown compared with cases where the surface film layer contained only the particles mainly containing the simple substance and/or compound of the A group element.

As shown in Table 4, it was confirmed that Invention Examples C1 to C24 in which any of Ca, Mg, Sr, and Ti was added to the plating layer were excellent in terms of the chemical convertibility and the corrosion resistance after coating compared with cases where these elements were not added to the plating layer.

Hitherto, the preferred embodiment and examples of the present invention have been described, but these embodiment and examples are merely examples within the scope of the gist of the present invention, and the addition, omission, substitution, and other modification of the configuration within the scope of the gist of the present invention are possible. That is, the present invention is not limited by the above description, but is limited only by the attached claims, and it is needless to say that the present invention can be modified as appropriate within the scope of the claims.

BRIEF DESCRIPTION OF THE REFERENCE SYMBOLS

1 Steel sheet
2 Plating layer
3 Surface film layer
10 Plated steel sheet for hot stamping

The invention claimed is:

1. A plated steel sheet for hot stamping comprising:
    a steel sheet;
    a plating layer formed on either surface or both surfaces of the steel sheet and having an Al content of 60 mass % or more; and
    a surface film layer formed on the plating layer,
    wherein a thickness t of the plating layer is 10 to 60 μm,
    an average crystal grain diameter of the plating layer in a thickness range from an interface between the plating layer and the surface film layer to a position at ⅔ of the thickness t from an interface between the plating layer and the surface film is 2t/3 or less and 15.0 μm or less,
    the surface film layer contains particles containing one or more elements selected from A group elements of Sc, V, Mn, Fe, Co, Ce, Nb, Mo, and W,
    a total content of the A group elements in the surface film layer is 0.01 to 10.0 g/m$^2$, and
    an average grain diameter of the particles containing the A group elements is 0.05 to 3.0 μm.

2. The plated steel sheet for hot stamping according to claim 1,
    wherein at least some of the particles containing the A group elements contain O.

3. The plated steel sheet for hot stamping according to claim 1,
    wherein the surface film layer further contains particles containing one or more elements selected from B group elements of Zn, Zr, and Ti, and
    a total content of the B group elements in the surface film layer is 0.01 to 10.0 g/m$^2$.

4. The plated steel sheet for hot stamping according to claim 2,
    wherein the surface film layer further contains particles containing one or more elements selected from B group elements of Zn, Zr, and Ti, and a total content of the B group elements in the surface film layer is 0.01 to 10.0 g/m².

5. The plated steel sheet for hot stamping according to claim 3,
wherein the total content of the B group elements in the surface film layer is 0.2 g/m² or less.

6. The plated steel sheet for hot stamping according to claim 4,
wherein the total content of the B group elements in the surface film layer is 0.2 g/m² or less.

7. The plated steel sheet for hot stamping according to claim 1,
wherein the plating layer contains one or more of:
Si: 0.1 to 20 mass %;
Fe: 0.1 to 10 mass %; and
Zn: 0.1 to 40 mass %.

8. The plated steel sheet for hot stamping according to claim 1,
wherein a total content of Ca, Mg, Sr, and Ti in the plating layer is 0.01 to 20 mass % of the entire plating layer.

9. The plated steel sheet for hot stamping according to claim 1,
wherein the A group elements comprising one or more of Sc and Nb.

10. A hot-stamped member that is obtained by hot-stamping the plated steel sheet for hot stamping according to claim 6, the hot-stamped member comprising:
an oxide film layer containing one or more elements selected from the A group elements of Sc, V, Mn, Fe, Co, Ce, Nb, Mo, and W, Al, and oxygen on a surface.

11. The hot-stamped member according to claim 10,
wherein the A group elements comprise one or more of Sc and Nb.

* * * * *